(12) United States Patent
Nakatani et al.

(10) Patent No.: US 6,400,107 B1
(45) Date of Patent: Jun. 4, 2002

(54) MOTOR CONTROL DEVICE CAPABLE OF DRIVING A SYNCHRONOUS MOTOR WITH HIGH EFFICIENCY AND HIGH RELIABILITY

(75) Inventors: Masaji Nakatani, Nara; Hideshi Ohtsuka, Tenri, both of (JP)

(73) Assignee: Sharp Kabushiki Kaisha (JP)

( * ) Notice: Subject to any disclaimer, the term of this patent is extended or adjusted under 35 U.S.C. 154(b) by 0 days.

(21) Appl. No.: 09/630,177

(22) Filed: Aug. 1, 2000

(30) Foreign Application Priority Data

Aug. 4, 1999 (JP) .......................... 11-221036
Dec. 24, 1999 (JP) .......................... 11-366796

(51) Int. Cl.⁷ ............................................. H02K 23/00
(52) U.S. Cl. ..................... 318/254; 318/439; 318/606; 318/608
(58) Field of Search .................. 318/138, 254, 318/439, 606, 608, 805, 806, 807, 811, 812

(56) References Cited

U.S. PATENT DOCUMENTS 5,206,575 A * 4/1993 Nakamura et al. .......... 318/807
6,121,736 A * 9/2000 Narazaki et al. ............ 318/254

FOREIGN PATENT DOCUMENTS

JP        10-341594      12/1998
WO       WO95/27328     12/1995

OTHER PUBLICATIONS

"Rotary Machine Employing Reluctance Torque", Nobuyuki Matsui et al., T.IEE Japan, vol. 114–D, No. 9, 1994, pp. 824–832.

* cited by examiner

Primary Examiner—Khanh Dang
(74) Attorney, Agent, or Firm—David G. Conlin; Steven M. Jensen; Edwards & Angell, LLP

(57) ABSTRACT

A control unit is arranged for a synchronous motor formed of a rotor provided with a magnet. The control unit includes a 180°-conduction drive unit for performing 180°-conduction drive of the synchronous motor, a 120°-conduction drive unit for performing 120°-conduction drive of the synchronous motor, a rotation speed calculating unit for calculating the motor rotation speed, a rotation-speed-vs.-efficiency table unit storing an efficiency relative to a rotation speed of the motor, and a drive method selecting unit for selecting an optimum drive method for the current rotation speed based on the current rotation speed and information stored in the rotation-speed-vs.-efficiency table unit. Thereby, the synchronous motor performs 120°- or 180°-conduction drive in accordance with the current rotation speed to achieve the drive with an optimum efficiency.

25 Claims, 31 Drawing Sheets

180° SINUSOIDAL CONDUCTION DRIVE WAVEFORMS

120° RECTANGULAR WAVE CONDUCTION WAVEFORMS

150° RECTANGULAR WAVE CONDUCTION DRIVE WAVEFORM

MOTOR CONTROL DEVICE CAPABLE OF DRIVING A SYNCHRONOUS MOTOR WITH HIGH EFFICIENCY AND HIGH RELIABILITY

BACKGROUND OF THE INVENTION

1. Field of the Invention

The present invention relates to a motor control device, and particularly a motor control device which can drive a synchronous motor formed of a rotor provided with magnets with high efficiency and high reliability.

2. Description of the Background Art

In recent years, environmental issues have become an object of public concern, and great attention has been given to saving of energy. Particularly, in the field of electric motors, it has been desired to produce a motor having small sizes as well as high efficiency and high output power in view of saving of energy.

Motors such as a dielectric motor and an SPM (Surface Permanent Magnet) motor, which is provided with permanent magnets fixed to a surface of a rotor, are typical examples of the motors in the prior art, and these motors are superior in mass productivity.

Further, motors having structures different from the conventional structures have been developed. Among these motors, an attention has been given to an IPM (Interior Permanent Magnet) motor, in which permanent magnets for further increasing the efficiency are embedded in a rotor for utilizing a reluctance torque in addition to a Fleming torque.

FIG. 35 shows an example of a structure of the IPM motor. The IPM motor shown in FIG. 35 includes a rotor formed of a rotor core 131, which is formed of an iron core having a high magnetic permeability or layered ferrosilicon plates, and permanent magnets 132 embedded in rotor core 131. The IPM motor shown in FIG. 35 is a four-pole motor, in which four permanent magnets 132 are arranged such that N- and S-poles are arranged alternately to each other in the circumferential direction, although FIG. 35 shows only half a section.

In FIG. 35, a reference number 134 indicates a unit around which a coil is wound, a reference number 135 indicates a stator and a reference number 136 indicates teeth. According to this structure, a difference occurs between an inductance Ld in a direction of a d-axis extending from a center of permanent magnets 132 to a center of a rotor core 131 and an inductance Lq in a direction of a q-axis shifted by an electrical angle of 90 degrees from the d-axis. Thereby, a reluctance torque Tr occurs in addition to a Fleming torque Tm.

The relationship between them is analyzed in "Rotary Machine Employing Reluctance Torque" (Nobuyuki Matsui, et al., T. IEE Japan, Vol. 114-D, No.9, 1994), which will be referred to as a "reference 1" hereinafter. According to the reference 1, the relationship between Fleming torque TM and reluctance torque Tr satisfies the following formula (1).

$$Tt = Tm + Tr \quad (1)$$
$$= Pn \cdot \phi a \cdot ia \cdot \cos\beta + Pn \cdot 1/2 \cdot (Ld - Lq) \cdot ia^2 \cdot \sin 2\beta$$

where Pn represents a number of pair of poles, φa represents a flux linkage, Ld indicates an inductance in the d-axis direction, Lq represents an inductance in the q-axis direction, id represents a current in the q-axis direction, β represents a current phase and ia represents a magnitude of a current vector.

As current phase β changes, Fleming torque Tm, reluctance torque Tr and a total torque Tt change as described below with reference to FIG. 36. As shown in FIG. 36, Fleming torque Tm takes on a maximum value when current phase β is 90 degrees, decreases as current phase β changes from 90 degrees, and becomes equal to 0 degrees when current phase β is 180 degrees. In contrast to this, reluctance torque Tr takes on a maximum value when current phase β is 135 degrees. Therefore, total torque Tt which is a sum of reluctance torque Tr and Fleming torque Tm takes on a maximum value when current phase β is equal or close to 115 degrees although it depends on a torque ratio. Accordingly, the IPM motor which effectively utilizes reluctance torque Tr can issue a higher torque than the SPM motor operating only with Fleming torque Tm, if these motors use the same current.

A motor drive controlling method is a major factor for determining a magnitude of the torque of the motor. In a conventional current drive method, 120° rectangular wave drive is generally performed. According to this 120° rectangular wave drive method, a current is supplied to two among three (U, V and W) phases of motor coils so that the currents joined at every 120 degrees form a direct current, and thereby an inverter is controlled. According to the 120° rectangular wave drive, an unconduction period is provided for every phase, and an induced voltage which is generated in the stator coil by rotation of a rotor magnet during this unconduction period is detected for controlling the rotor rotation. In the IPM motor utilizing reluctance torque Tr described above, the conduction timing is important conditions that can maximize the torque. In the IPM motor, therefore, the 120° rectangular wave drive is performed, and the induced voltage is detected during the unconduction period for calculating the rotor phase.

In contrast to this, a 180° sinusoidal drive method in which the conduction width is set to 180 degrees in electrical angle may also be employed as a motor drive control method for improving the motor efficiency. According to "Method of Controlling Driving of Brushless DC Motor, and Apparatus Therefor, and Electric Machinery and Apparatus Used Therefor" (International Laying-Open No. WO95-27328), which will be referred to as a "reference 2", the conduction width is set to 180 degrees in electrical angle in a motor provided with embedded permanent magnets, and positions of magnetic poles are detected based on differences between a first center point potential of the motor coil and a second central point potential attained by a bridge circuit which is electrically parallel to the motor coil.

A brushless DC motor control device disclosed in the reference 2 will now be described with reference to FIG. 37. FIG. 37 schematically shows a structure of a motor control device disclosed in the reference 2. In FIG. 37, an inverter is formed by employing three switching transistor pairs 212u, 212v and 212w, each of which is connected in series between terminals of a DC power supply 211, and the voltage on the connection line between the switching transistors in each pair is applied to corresponding one of Y-connected stator windings 213u, 213v and 213w of the respective phases in the brushless DC motor. The voltage on the connection point between the switching transistors in each pair is also applied to corresponding one of Y-connected resistances 214u, 214v and 214w. A voltage on a neutral point 213d is applied to an inverted input terminal of an amplifier 215 via a resistance 215a, and a voltage on a neutral point 214d of the Y-connected resistances is applied to a noninverted input terminal of amplifier 215. By connecting a resistance 215b between an output terminal and the inverted input terminal of amplifier 215, the structure can operate as a differential amplifier. A voltage EnO on neutral point 213d among stator windings 213u, 213v and 213w is equal to a sum of an inverter output waveform and a 3n-th (n: integer) harmonic components contained in the motor induced voltage waveform. A voltage on neutral point 214d among Y-connected resistances 214u, 214v and 214w is determined only by the output waveform of the inverter. Therefore, the 3n-th harmonic components contained in the motor induced voltage waveform can be taken out by obtaining the difference between voltage EnO on neutral point 213d and the voltage on neutral point 214d. By the foregoing manners, the motor induced voltage waveform, i.e., the rotor position can be detected without using the magnetic pole position sensor, and therefore the 180°-drive method can be achieved.

"Controller for Electric Vehicle" (Japanese Patent Laying-Open No. 10-341594, which will be referred to as a "reference 3" hereinafter) has disclosed a structure, in which the 120° drive method or the 180° drive method are selected, if necessary, when an abnormal condition occurs in a magnetic pole position detector or a rotary pulse detector.

According to the structure of the reference 2 described before, an external circuit such as a differential amplifier is provided for resistance connection 214u, 214v and 214w providing the center point of the motor coil connection so that the rotor position can be detected in the 180° sinusoidal conduction state.

In the synchronous motor, the 120° rectangular wave drive method may provide higher efficiency than the 180° sinusoidal drive method in some cases depending on the state (e.g., output and rotation speed) of the motor, and therefore driving only by the 180° sinusoidal drive method cannot always provide the optimum efficiency.

The system in the reference 3 is aimed at dealing with, e.g., a situation in which abnormal conditions occur in a rotary pulse detecting circuit in the control device for the electric vehicle not provided with the magnetic pole position detecting circuit, or a situation in which abnormal conditions occur in both the magnetic pole position detector and the rotary pulse detecting circuit in the control device for the electric vehicle provided with the magnetic pole position detector. Therefore, the system of the reference 3 cannot be the optimum system in view of efficiency.

The 120° drive method is executed in the case where an abnormal condition occurs for the purpose of continuing the driving without stopping the motor, and the control method during this driving is based on an estimated magnetic pole position which is estimated by a magnetic pole position estimating circuit. Accordingly, disadvantages relating to efficiency cannot be overcome at all.

In the prior art, a sensor-less drive method for controlling and driving a synchronous motor without using a motor rotor position sensor employs the following intermittent-conduction drive. According to the intermittent-conduction drive, a predetermined unconduction period is present in the operation of conduction the motor coil, and a counter electromotive voltage, which is generated in the motor coil by rotation of the motor during the unconduction period, is detected through a motor coil terminal, so that the conduction timing is determined in accordance with this counter electromotive voltage. According to this conduction drive method, a so-called 120°-conduction drive method such as 120° rectangular wave drive is generally employed.

Alternatively, so-called 180°-conduction drive such as sinusoidal conduction drive may also be employed, in which case the synchronous motor is driven without providing an unconduction period. More specifically, such a method may be employed that resistances are connected in parallel to a neutral point of three-phase motor coils and the three-phase motor coils, and the voltage on the neutral point is compared with the voltage on the resistance neutral point for detecting the motor electromotive voltage for determining the conduction timing of the motor and thereby driving the motor. Also, such methods may be employed that fast arithmetic of the motor current is performed for detecting the motor position, and thereby the conduction timing is determined for driving the motor, or that the motor is driven by determining the conduction timing based on the phase difference between the motor drive voltage and the motor current.

Generally, the 180°-conduction drive method provides a smoother drive waveform than the 120°-conduction drive, and therefore causes less variations in torque and rotation speed.

In the synchronous motor of a permanent magnet rotor structure, conduction of the motor is performed in accordance with accurate timing corresponding to the position of the permanent magnet, and the optimization of this conduction timing is essential for driving the motor. In addition to this essential condition, the conduction timing must be set to the optimum timing depending on the respective rotation conditions for achieving high efficiency and stable rotation.

According to the intermittent-conduction drive such as 120°-conduction drive, a counter electromotive voltage related to a permanent magnet flux and an armature flux is directly detected, and the permanent magnet position and thus the rotational position are actually detected. Therefore, the motor drive can be performed in accordance with accurate conduction timing by improving the detection accuracy, e.g., by removing noises. More specifically, since the motor rotational position is directly detected, disadvantages such as stop of the motor can be suppressed even when a disturbance is applied.

Compared with the intermittent-conduction drive such as 120°-conduction drive, the 180°-conduction drive without a position sensor can improve the efficiency and can reduce noises and vibrations more effectively, but the 180°-conduction drive without a position sensor generally suffers from complicated drive and control. This is due to the fact that the motor rotational position is not directly detected, and the detection of the conduction timing is performed with a low accuracy. Therefore, the disadvantage such as stop of the motor is likely to occur when a disturbance is applied.

For example, according to the 180°-conduction drive method in which the conduction timing is determined based on a comparison between the coil neutral point and the resistance neutral point, the conduction timing of the drive voltage is controlled. However, it is the motor current that actually determines the motor torque. According to the 180°-conduction drive not employing an off period, a phase difference occurs between the drive voltage and the motor current due to an influence by the counter electromotive voltage of the permanent magnet and the coil inductance. If this difference is deemed as the conduction timing, the sensitivity to the motor current is higher than the drive voltage. From experiments, such a result was obtained that the sensitivity increases two through three times compared with the intermittent-conduction drive under some rotation conditions. Therefore, very strict detection of the conduction timing is required. Thus, the 180°-conduction drive requires the accuracy which is higher by two to three times higher than that in the intermittent-conduction drive.

According to the 180°-conduction drive method in which the motor current is analyzed by fast arithmetic for determining the conduction timing, the detection resolution of the conduction timing is usually impaired by an electrical angle of about 5 degrees compared with the intermittent-conduction drive due to a detection error, an arithmetic error, an arithmetic delay and others of the motor current.

Further, according to the 180°-conduction drive method based on the phase difference between the motor drive voltage and the motor current, the conduction operation is switched in accordance with elapsing of time by so-called forced excitation, and the motor current phase difference at the time of this switching and thus the conduction timing are controlled. However, the error in control of the motor current phase difference directly results in the error in conduction timing. Therefore, it is necessary to control strictly the phase difference for achieving the stable driving and maintaining the motor rotation. This restrict control can be performed when no disturbance occurs, but the control becomes particularly instable when the disturbance occurs. The conduction timing in the intermittent-conduction drive depends on the detected counter electromotive voltage, and therefore the accurate conduction timing can be achieved regardless of the control performance. Accordingly, the phase difference control requires more accurate and strict control than the intermittent-conduction drive.

As described above, the 180°-conduction drive requires the accurate and strict control. Therefore, it cannot achieve efficient drive if disturbances reducing the control margin occurs. Further, it suffers from problems such as error in motor conduction control and stop of the motor. The possibility of occurrence of these problems is extremely higher than that in the intermittent-conduction drive such as 120°-conduction drive.

The above disturbances specifically include changes in power supply voltage supplied to the inverter driving the device or synchronous motor, changes in motor rotation speed and changes in load torque. In the 180°-conduction drive, the control is generally difficult as compared with the intermittent-conduction drive such as 120°-conduction drive, and therefore the robustness against the disturbance is generally low.

As described above, the 180°-conduction drive method is superior in efficiency, torque vibrations, rotation vibrations and noises, but has low control robustness. Further, according to the 180°-conduction drive method, the control performance itself is improved, e.g., by raising the control gain as measures against the disturbances. However, the disturbances which cannot be covered by the improved control performance may cause problems such as stop of the motor because measures cannot be taken against such disturbance.

As already stated, the reference 3 has disclosed the structure for switching the operation between the 120°-conduction drive method and the 180°-conduction drive method.

In the structure disclosed in the reference 3, however, a rotational pulse generating circuit such as an encoder is used during the 180°-conduction drive, and a position sensor for detecting the motor position is required. Accordingly, the structure in the reference 3 cannot be utilized in the structure for driving the motor without a position sensor.

According to the system of the reference 3, the drive method is switched in such a manner that the 120°-conduction drive is selected when an output of neither a position sensor nor a rotation pulse generating circuit can be obtained, or that the 180°-conduction drive is selected in a low speed range where a counter electromotive voltage cannot be detected without difficulty, and the 120°-conduction drive is selected in the middle and high speed range. Thus, the selection is performed only based on the rotation speed. Accordingly, it is impossible to deal with the specific conditions of occurrence of disturbances affecting the motor driving, and therefore it is impossible to achieve the motor driving with high efficiency, low noises, low vibrations and high reliability.

SUMMARY OF THE INVENTION

An object of the invention is to provide a motor control device which can efficiently drive a synchronous motor including a rotor unit provided with a magnet.

Another object of the invention is to provide a motor control device which can drive a synchronous motor including a rotor provided with a magnet with high efficiency and high reliability without using a position sensor while dealing with disturbances.

In summary, the invention provides a motor control device including a drive control circuit for controlling a synchronous motor. The drive control circuit controls the drive of the synchronous motor. The drive control circuit includes a plurality of conduction drive circuits for conducting and driving the synchronous motor. The plurality of conduction drive circuits include at least a 180°-conduction drive circuit for performing 180°-conduction drive of the synchronous motor, and a 120°-conduction drive circuit for performing 120°-conduction drive of the synchronous motor. The drive control circuit selects one of the plurality of conduction drive circuits in accordance with a motor efficiency of the synchronous motor.

Accordingly, a major advantage of the invention is that optimum driving in view of the motor efficiency, and more specifically driving of the synchronous motor with the optimum efficiency can be performed by selecting the plurality of conduction drive circuits.

According to another aspect of the invention, a motor control device for controlling a synchronous motor includes a drive control circuit. The drive control circuit controls chive of the synchronous motor. The drive control circuit includes a conduction width corresponding drive circuit for arbitrarily setting a conduction width of the synchronous motor. The drive control circuit controls the conduction width corresponding drive circuit in accordance with a motor efficiency of the synchronous motor.

Accordingly, the synchronous motor can be driven with the optimum conduction width in view of the motor efficiency, and thus with the optimum efficiency.

According to still another aspect of the invention, a motor control device for driving and controlling a synchronous motor formed of a rotor provided with a permanent magnet and a drive circuit for driving the synchronous motor without using a position sensor, includes a 180°-conduction drive circuit, an intermittent drive circuit, a motor disturbance monitoring circuit and a drive method selecting circuit. The 180°-conduction drive circuit is provided for performing 180°-conduction drive of the synchronous motor. The intermittent-conduction drive circuit is provided for performing intermittent-conduction drive of the synchronous motor with an unconduction period and a conduction angle smaller than 180 degrees. The motor disturbance monitoring circuit is provided for monitoring a disturbance against the synchronous motor and the drive circuit. The drive method selecting circuit selects one of the 180°-conduction drive and the intermittent-conduction drive as a drive method of the synchronous motor in accordance with an output of the motor disturbance monitoring circuit.

Accordingly, the 180°-conduction drive circuit and the intermittent-conduction drive circuit can be appropriately selected in accordance with the disturbance so that the motor drive with high efficiency, low noises and low vibrations can be achieved during the steady state in which disturbances are small, and the motor drive with high reliability can be achieved without causes disadvantages such as stop of the motor during the unusual state in which the disturbances are detected.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
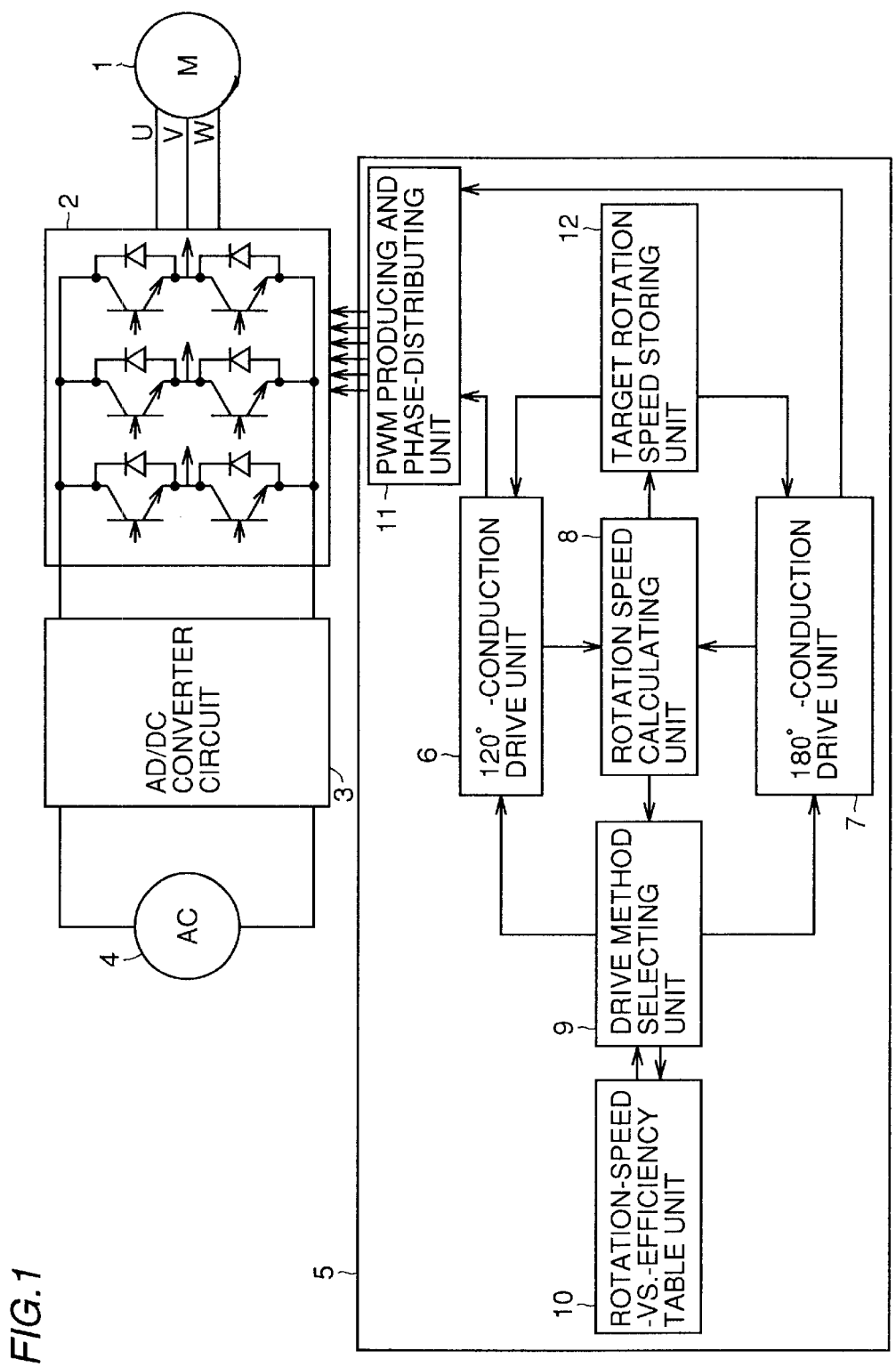
FIG. 1 shows a structure of a motor control device of a first embodiment of the invention.

Embodiments of the invention will now be described with reference to the drawings. In the figures, the same or corresponding units bear the same reference numbers, and description thereof is not repeated.

First Embodiment

A motor control device of a first embodiment of the invention will now be described with reference to FIG. 1. The motor control device shown in FIG. 1 includes an inverter circuit 2, an AC power supply 4, an AC/DC converter circuit 3 for converting a power supplied from AC power supply 4 into a direct current and supplying it to inverter circuit 2, and a control unit 5. These are employed for driving an IPM motor (synchronous motor 1) using both a Fleming torque and a reluctance torque for increasing an output torque.

Control unit 5 includes a 120°-conduction drive unit 6 for performing 120°-conduction drive of synchronous motor 1, a 180°-conduction drive unit 7 for performing 180°-conduction drive of synchronous motor 1, a rotation speed calculating unit 8 for detecting or calculating the rotation speed of synchronous motor 1, a drive method selecting unit 9 for selecting the drive method achieving an optimum efficiency based on the rotation speed issued from rotation speed calculating unit 8 and information stored in a rotation-speed-vs.-efficiency table which will be described later, a rotation-speed-vs.-efficiency table unit 10 which has already stored the relationships between the rotation speeds and the efficiencies in respective drive methods of synchronous motor 1, a PWM producing and phase-distributing unit 11 which issues a PWM waveform to each drive element of inverter circuit 2 based on the conduction voltage issued from 120°-conduction drive unit 6 or 180°-conduction drive unit 7, and a target rotation speed storing unit 12 for storing a target rotation speed (i.e., speed to be achieved).

Control unit 5 is formed of a microcomputer. The respective components 6–12 described above are achieved by software. Program contents for the processing in these components 6–12 may be stored in a memory such as an ROM (Read Only Memory) prior to shipment, may be stored in a rewritable memory such as a flash ROM, in which case renewal, correction and others of the program contents can be done when necessary or desired. Instead of the above structure, the respective components in control unit 5 may be formed of hardware performing similar processing.

The AC voltage supplied from AC power supply 4 is converted by AC/DC converter circuit 3 into a DC voltage, and is supplied to inverter circuit 2. Switching in respective drive elements such as Transistors and IGBTs (Insulated Gate Bipolar Transistors) forming inverter circuit 2 is performed with a desired duty in accordance with a PWM waveform issued from PWM producing and phase-distributing unit 11. Thereby, the voltage is applied to the respective phases U, V and W of the IPM motor, i.e., synchronous motor 1, and thereby the motor is driven.

Figure 2:
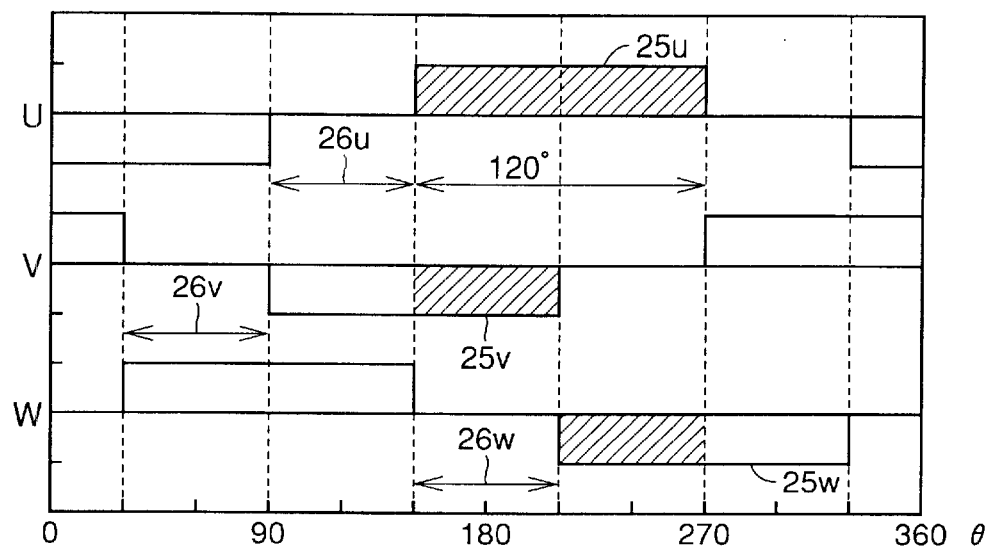
FIG. 2 shows a 120°-conduction drive method.

120°-conduction drive unit 6 applies the voltage to the motor coil for a period of 120 degrees. FIG. 2 shows the waveforms of voltages applied according to the 120°-conduction drive. In FIG. 2, the abscissa gives a coil conduction electrical angle, and the ordinate gives a voltage. It is assumed that the motor to be driven includes stator coils of three phases U, V and W, and references 25U, 25V and 25W indicate the applied voltage waveforms of the U-, V- and W-phases, respectively.

For the U-phase, as shown in FIG. 2, conduction with a rectangular wave is performed for the period of 120 degrees, and the remaining period of 60 degrees forms an unconduction period 26u. Conduction for the V- and W-phases is performed with rectangular waves providing phase differences of 120 degrees and 240 degrees with respect to the wave for U-phase, respectively. For the V- and W-phases, unconduction periods 26v and 26w each having a length of 60 degrees are provided, respectively.

Figure 3:
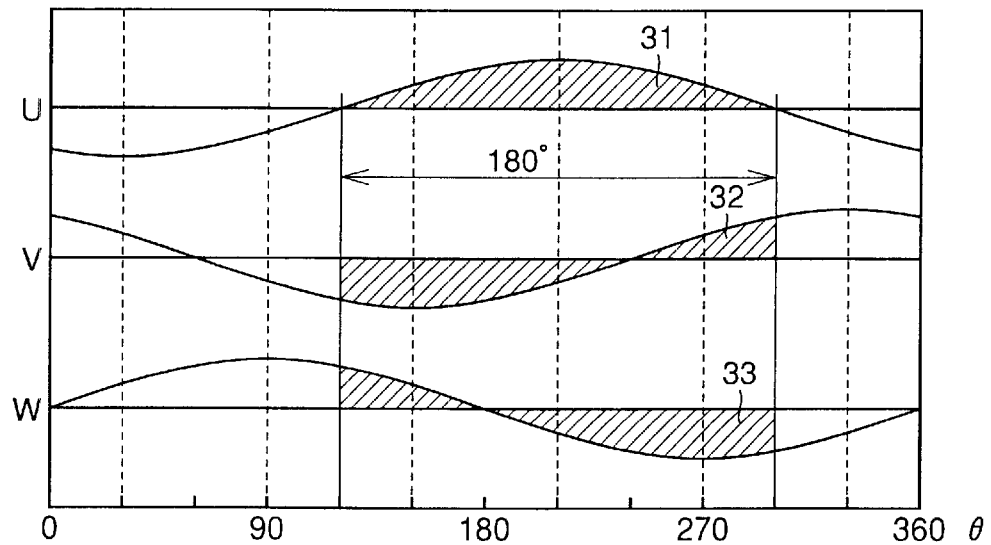
FIG. 3 shows a 180°-conduction drive method.

Referring to FIG. 1, 180°-conduction drive unit 7 applies the voltage to the motor coil for a period of 180 degrees. FIG. 3 shows the waveforms of the voltages in this 180°-conduction drive. In FIG. 3, the abscissa gives the coil conduction electrical angle, and the ordinate gives the voltage. The motor to be driven has the stator coils of three phases, i.e., U-, V- and W-phases. References 31, 32 and 33 indicate the supplied voltage waveforms of U-, V- and W-phases.

In the 180°-conduction drive method, as shown in FIG. 3, each phase is conducted with a sinusoidal wave. Assuming that the U-phase coil is the reference coil, the conduction waves for the V- and W-phases provide phase differences of 120 degrees and 240 degrees, respectively.

Referring to FIG. 1, rotation speed calculating unit 8 receives information relating to the rotation speed of synchronous motor 1 from 120°-conduction drive unit 6 or 180°-conduction drive unit 7. This rotation speed information is obtained by a known method such as a method of calculating the rotation speed from the induced voltage, a method using a rotation speed detector such as a sensor or a method of using an external center detecting circuit. Any one of these methods can be used.

Drive method selecting unit 9 selects the drive method achieving the optimum efficiency in accordance with the rotation speed based on the rotation speed information issued from rotation speed calculating unit 8 as well as a table representing the relationships between the rotation speed and the efficiency in the respective drive methods, which are stored in rotation-speed-vs.-efficiency table unit 10. More specifically, drive method selecting unit 9 selects one of 120°-conduction drive unit 6 and 180°-conduction drive unit 7.

The conduction drive unit (i.e., 120°-conduction drive unit 6 or 180°-conduction drive unit 7) selected by drive method selecting unit 9 issues the voltage data to PWM producing and phase-distributing unit 11. PWM producing and phase-distributing unit 11 determines the duty ratio of the PWM signal based on the voltage data, distributes the PWM signal to each drive element included in inverter circuit 2, and issues an instructing signal for switching each drive element.

Target rotation speed storing unit 12 compares the current rotation speed information of the motor issued from rotation speed calculating unit 8 and the target rotation speed for calculating an error or difference, and issues error correction data to 120°-conduction drive unit 6 or 180°-conduction drive unit 7 for achieving an appropriate motor rotation speed (i.e., motor speed).

Figure 4:
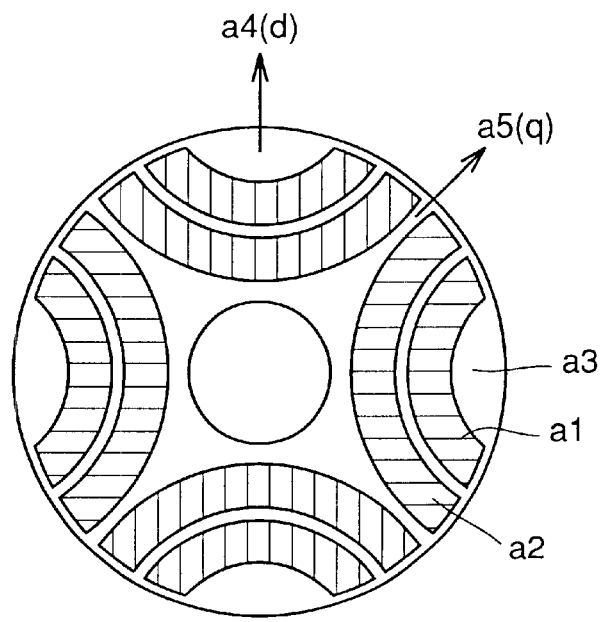
FIG. 4 is a cross section showing a structure of an IPM motor (A)

The following experiments were done with synchronous motor 1 which was driven by the motor control device having the foregoing structures. Two kinds of IPM motors (A) and (B) used in the experiments will now be described with reference to FIGS. 4 and 5. FIG. 4 shows a section of a rotor of the IPM motor (A) used in the experiment. In FIG. 4, references a1 and a2 indicates permanent magnets, respectively, which are embedded in the rotor and are convex toward the center of the rotor, and a reference a3 indicates the rotor made of a material having a high magnetic permeability or layered ferrosilicon plates. A reference a4 indicates an axis (i.e., d-axis) extending through the centers of the permanent magnets and the rotor, and a reference a5 indicates an axis (q-axis) shifted by an electrical angle of 90 degrees from the d-shaft.

Figure 5:
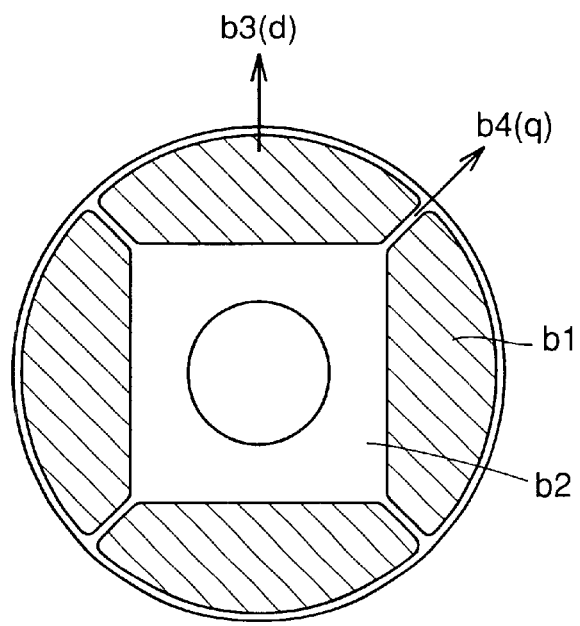
FIG. 5 is a cross section showing a structure of an IPM motor (B)

FIG. 5 is a cross section of a rotor of the IPM motor (B) used in the experiment. In FIG. 5, a reference b1 indicates a permanent magnet embedded in the rotor, and a reference b2 indicates the rotor formed of layered ferrosilicon plates. A reference b3 indicates an axis (i.e., d-axis) extending through the centers of the permanent magnets and the rotor, and a reference b4 indicates an axis (q-axis) shifted by an electrical angle of 90 degrees from the d-shaft.

In the IPM motor, the Fleming torque is prounital to a flux linkage, i.e., a magnetic field intensity of a magnet, and a reluctance torque is prounital to a difference in inductance between d-axis and q-axis. For example, in the IPM motor (A), magnets a1 and a2 issue the Fleming torque, and the reluctance torque is issued owing to the difference between inductances Ld and Lq in the d-axis and q-axis directions.

In the IPM motor (A), a magnetic flux in the d-axis direction passes twice a permanent magnet unit having the substantially same magnetic permeability as the air so that the magnetic resistance is large, and inductance Ld in the d-axis direction is small. In contrast to this, the magnetic flux in the q-axis direction passes a unit of a high magnetic permeability between the permanent magnets so that the magnetic resistance is small, and inductance Lq in the q-axis direction is large. Accordingly, a difference between inductances Ld and Lq is large in the IPM motor (A).

In the IPM motor (B), the Fleming torque produced by magnet b1 is similar to that in the IPM motor (A), but a difference between the magnetic resistances in the d-axis and q-axis directions is small. Therefore, the difference between inductances Ld and Lq is small so that the reluctance torque is smaller than that in the IPM motor (A). Between the IPM motors (A) and (B), therefore, the IPM motor (A) utilizes the reluctance torque for its operation to a higher extent.

Figure 6:
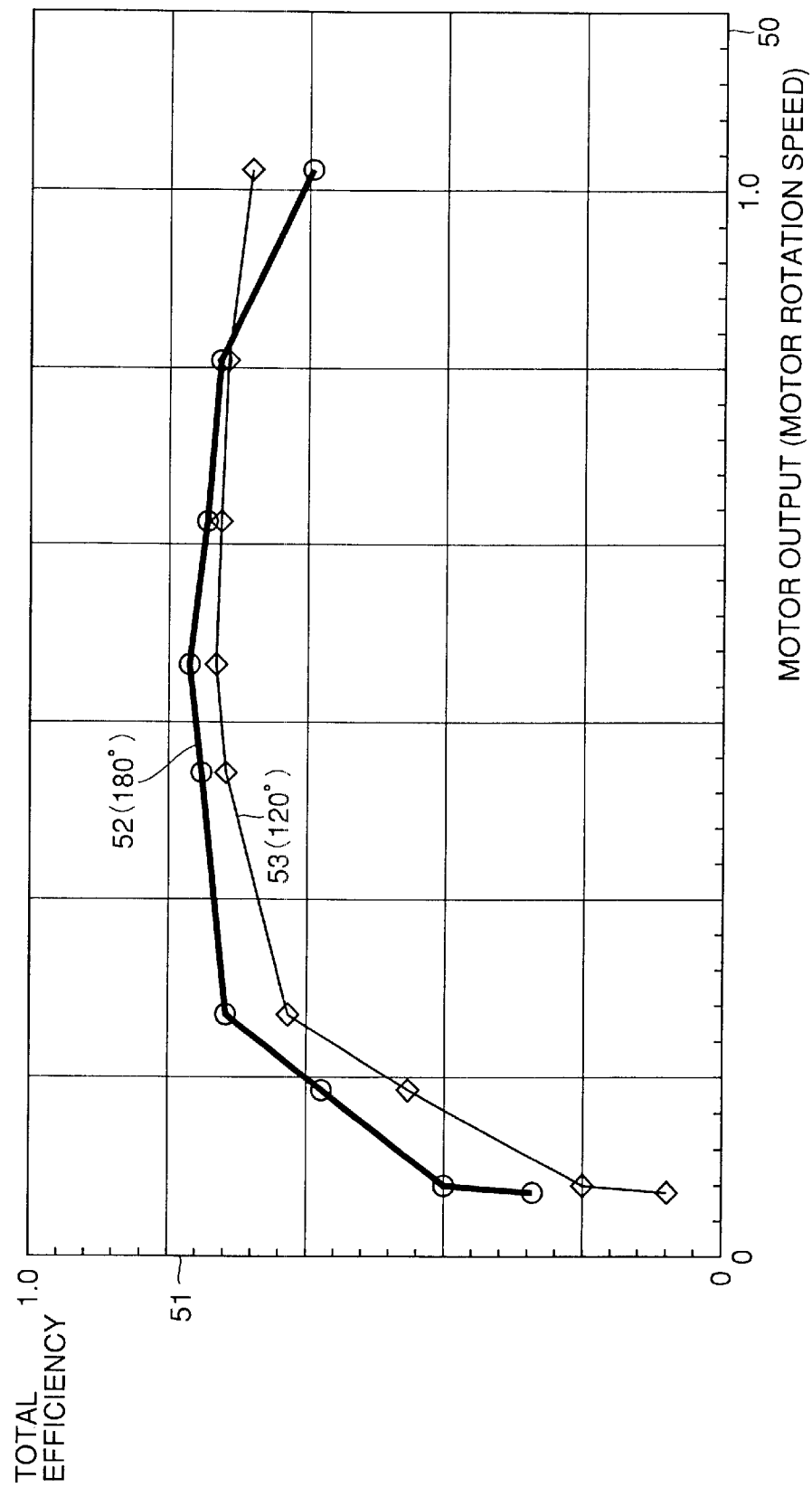
FIG. 6 shows results of an experiment for measuring total efficiency characteristics with respect to a motor output of the IPM motor (A)

FIG. 6 shows a result of an experiment for determining efficiency characteristics of the IPM motor (A) with respect to the motor output. In FIG. 6, a Y-axis 51 gives a dimensionless ratio of the total efficiency, and an X-axis 50 gives a dimensionless ratio of the motor output which is a product of the motor rotation speed and the load torque. Since the load torque is nearly constant, the dimensionless ratio of the motor rotation speed may be given on X-axis 50. The above total efficiency means an efficiency which is represented by a product of the motor efficiency representing the efficiency of the motor unit and the circuit efficiency representing the efficiency of the circuit unit. In FIG. 6, references 52 and 53 represent the efficiency characteristics in the 180°-conduction drive and the 120°-conduction drive, respectively.

In the IPM motor (A), as shown in FIG. 6, the 180°-conduction drive method provides a higher efficiency than the 120°-conduction drive method when the motor output or rotation speed is low. As the motor output or rotation speed rises, the efficiencies rise in both the methods. However, the rising rates of them are different so that the efficiency in the 120°-conduction drive method exceeds that in the 180°-conduction drive method, and the relationship in efficiency is inverted.

Figure 7:
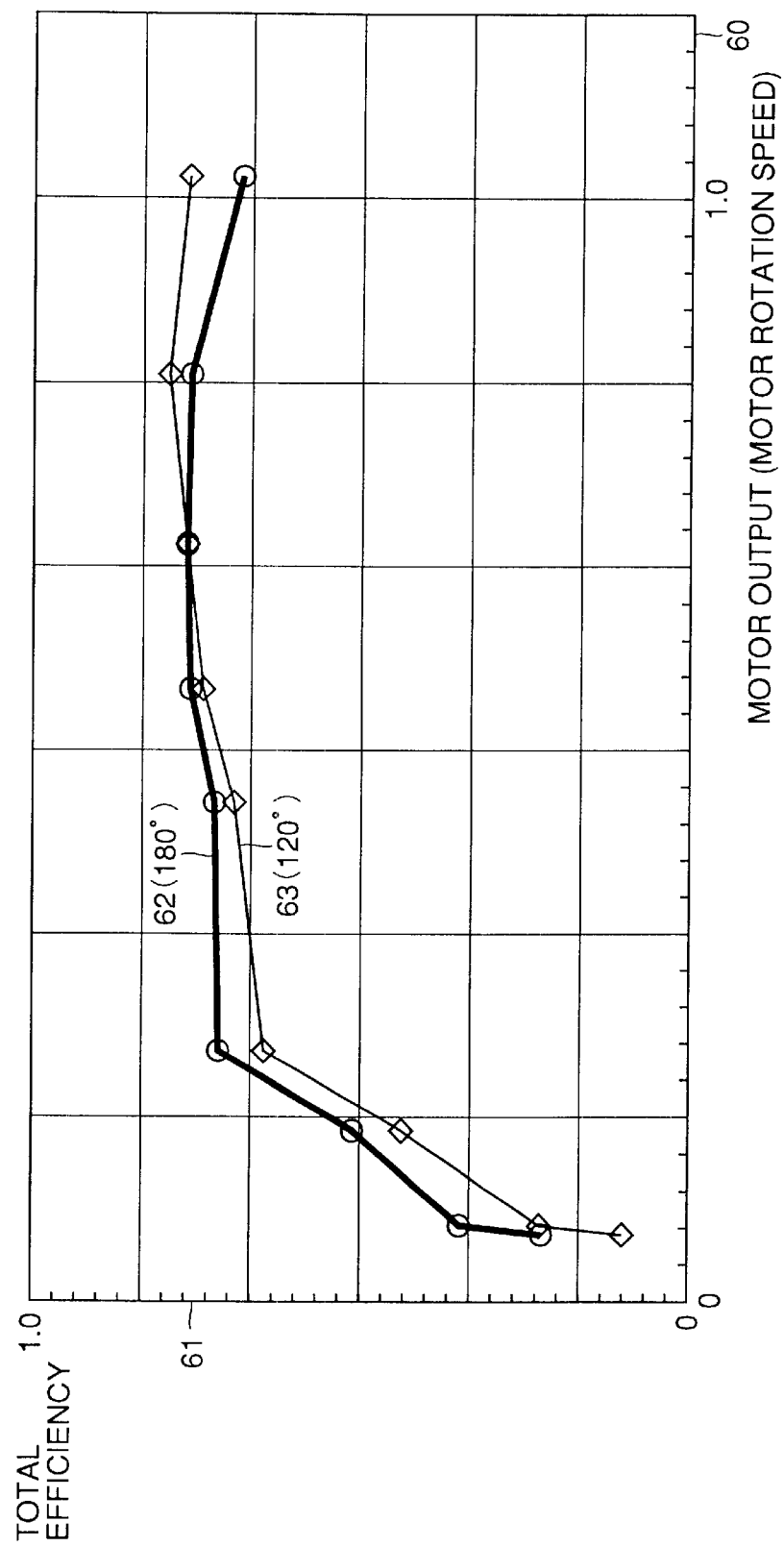
FIG. 7 shows results of an experiment for measuring total efficiency characteristics with respect to a motor output of the IPM motor (B)

FIG. 7 shows a result of an experiment for determining efficiencies with respect to the motor output in the IPM motor (B). In FIG. 7, a Y-axis 60 gives a dimensionless efficiency of the total efficiency, and an X-axis 61 gives the dimensionless ratio of the motor output or motor rotation speed. References 62 and 63 indicate the efficiency characteristics in the 180°-conduction drive and the 120°-conduction drive, respectively.

In the IPM motor (B), as shown in FIG. 7, the 180°-conduction drive method provides a higher efficiency than the 120°-conduction drive method when the motor output or rotation speed is low, similarly to the IPM motor (A). As the motor output or rotation speed rises, the efficiencies rise in both the methods. However, the rising rates of them are different so that the efficiency in the 120°-conduction drive method exceeds that in the 180°-conduction drive method, and the relationship in efficiency is inverted.

Description will now be made on the efficiencies in the 120°- and 180°-conduction drive methods. The total efficiency of the motor is represented by the following formula (2):

$$\text{Total Efficiency} = (\text{Motor Output})/((\text{Motor Input Electric Power}) + (\text{Motor Loss} + \text{Circuit Loss})) \quad (2)$$

Figure 8:
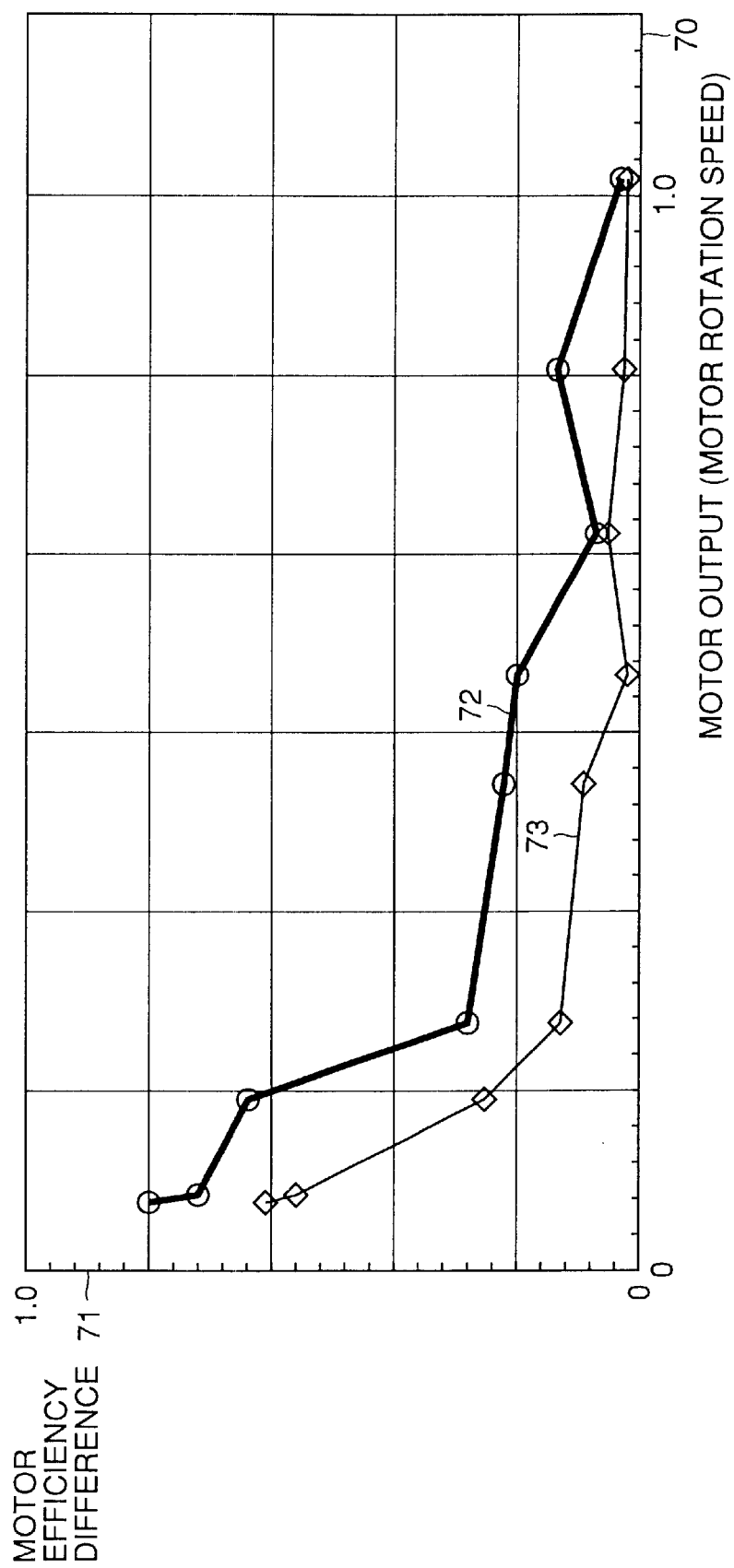
FIG. 8 shows results of an experiment for measuring motor efficiency characteristics with respect to the motor outputs of the IPM motors (A) and (B)

The motor loss in the formula (2) will now be described. FIG. 8 shows a result of an experiment for determining motor efficiency characteristics with respect to the motor outputs in the IPM motors (A) and (B). In FIG. 8, a Y-axis 71 gives a dimensionless ratio of the motor efficiency difference between the 120°- and 180°-conduction drive methods ((motor efficiency in 180°-conduction drive method) - (motor efficiency in 120°-conduction drive method). An X-axis 70 gives a dimensionless ratio of the motor output (motor rotation speed). References 72 and 73 indicate the motor efficiency difference characteristics of the IPM motors (A) and (B), respectively.

In the IPM motors (A) and (B), as shown in FIG. 8, the 180°-conduction drive method provides a higher efficiency than the 120°-conduction drive method when the motor output or rotation speed is low. As the motor output or rotation speed rises, a difference in efficiency between the 120°- and 180°-conduction drive methods decreases and disappears.

The motor loss includes a copper loss, an iron loss and a mechanical loss. In connection with the copper loss, the 180°-conduction drive method is more advantageous than the 120°-conduction drive method because the 180°-conduction drive method can generate a larger torque than the 120°-conduction drive method, and consumes a smaller current when the loads are constant. An eddy-current loss which is a kind of iron loss is prounital to the square of each of the magnetic flux density, plate thickness and frequency, and is inversely prounital to the specific electric resistance. Therefore, as the rotation speed increases, and in other words, as the frequency increases, the eddy-current loss increases. Therefore, the 180°-conduction drive method have the advantage in the low speed range because the copper loss is the predominant motor loss in this range. However, a difference in motor efficiency does not exist between the two methods in the high speed range because the eddy-current loss is predominant in the high speed range.

Figure 9:
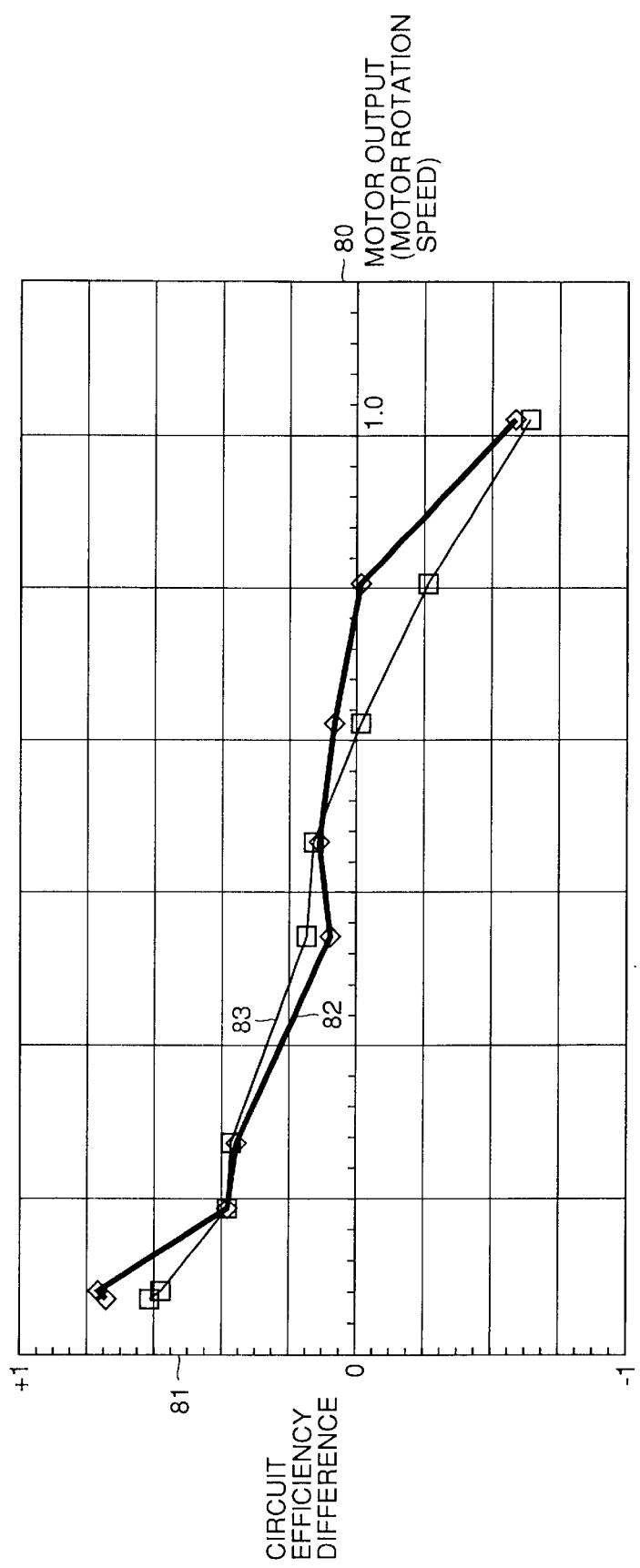
FIG. 9 shows results of an experiment for measuring circuit efficiency characteristics with respect to the motor outputs of the IPM motors (A) and (B)

Then, the circuit loss will be described. FIG. 9 shows a result of an experiment relating to the circuit efficiency characteristics with respect to the motor outputs of the IPM motors (A) and (B). In FIG. 9, a Y-axis 81 gives the dimensionless ratio of the circuit efficiency difference between the 120°- and 180°-conduction drive methods, and an X-axis 80 represents the dimensionless ratio of the motor output (motor rotation speed). References 82 and 83 indicate the motor efficiency characteristic difference characteristics of the IPM motors (A) and (B), respectively. The above circuit efficiency difference can be represented by the following formula (3).

$$(\text{Circuit Efficiency Difference}) = (\text{Circuit Efficiency in 180°-Conduction Drive Method}) - (\text{Circuit Efficiency in 120°-Conduction Drive Method}) \quad (3)$$

In both the IPM motors (A) and (B), as shown in FIG. 9, the 180°-conduction drive method provides a higher circuit efficiency than the 120°-conduction drive method when the motor output or rotation speed is low. As the motor output or rotation speed rises, a difference in circuit efficiency disappears between the 120°- and 180°-conduction drive methods, and the relationship between them is inverted in a certain range.

The circuit loss primarily includes the copper loss of the circuit and the switching loss of the circuit. The circuit loss exhibits characteristics similar to those of the loss of a motor alone. The switching loss of the transistor in inverter circuit 2 increases in prounital to the rotation speed. However, the 180°-conduction drive method employing a longer conduction period causes a larger switching loss than the 120°-conduction drive method. The copper loss is the predominant circuit loss in the low speed range. Therefore, the 180°-conduction drive method is more advantageous in circuit loss than the 120°-conduction drive method when the motor operates in the low speed range. In the high speed range, however, the switching loss increases so that the above advantage is lost, and the relationship in circuit efficiency between the 120°- and 180°-conduction drive methods may be inverted in a certain range.

From the viewpoint of the total efficiency which is determined taking the motor loss and the circuit loss into consideration, therefore, the 180°-conduction drive method is superior to the 120°-conduction drive method in the low speed range, but the 120°-conduction drive method is superior in the high speed range.

Based on the above results, the motor control device of the first embodiment of the invention has already stored the table, which exhibits the relationships between the motor rotation speed and the total efficiency in the respective drive methods of the corresponding motor, in the rotation-speedvs.-efficiency table unit 10. After synchronous motor 1 started the rotation, rotation speed calculating unit 8 detects the rotation speed in an appropriate manner, e.g., using a sensor, and sends the detected speed to drive method selecting unit 9. Rotation-speed-vs.-efficiency table unit 10 has stored information relating to the optimum drive methods for various values of the rotation speed, and the optimum drive method for the current speed is selected in drive method selecting unit 9.

Description will now be made on the case where the foregoing IPM motor (A) is used as synchronous motor 1. In this case, the 180°-conduction drive method is selected, e.g., in the initial low speed range.

When target rotation speed storing unit 12 receives an instruction to increase the speed from a system controller (not shown), it compares the detected rotation speed and the target rotation speed to issue an error signal. Thereby, 180°-conduction drive unit 7 transmits appropriate voltage data to PWM producing and phase-distributing unit 11, and is applied to synchronous motor 1 via inverter circuit 2. Consequently, the rotation speed rises.

When the speed rises to a certain extent, and particularly to a value around which the relationship in efficiency between the 180°-conduction drive and the 120°-conduction drive is inverted, drive method selecting unit 9 selects the 120°-conduction drive achieving high efficiency.

It may be necessary to perform the control at the vicinity of the rotation speed, which causes inversion of the relationship in total efficiency between the 180°-conduction drive and 120°-conduction drive, and will be referred to as a "cross rotation speed Nc" hereinafter. Alternatively, the motor may have such characteristics that the relationship in total efficiency between the 180°-conduction drive and 120°-conduction drive is inverted at the rotation speed to be controlled. In these cases, the drive method which can provide the maximum efficiency changes in accordance with slight change in rotation speed. If the drive is faithfully switched between 180°-conduction drive and 120°-conduction drive, this results in frequent switching of the drive method so that the control unit (microcomputer) is overloaded, and the stress on inverter circuit 2, synchronous motor 1 and others increases, resulting in reduction in lifetime in some cases.

For avoiding the above situation, hysteresis characteristics may be provided in the rotation speed at which switch between the 180°-conduction drive and the 120°-conduction drive is performed. In this manner, the following formula (4) is satisfied when performing the control from the lower rotation speed side to the high rotation speed side through cross rotation speed Nc, and the following formula (5) is satisfied when performing the control from the high rotation speed side to the low rotation speed side through cross rotation speed Nc.

Switching Rotation Speed=$Nc$(Cross Rotation Speed)+$\Delta N1$ (4)

Switching Rotation Speed=$Nc$(Cross Rotation Speed)+$\Delta N2$ (5)

In the formulas (4) and (5), $\Delta N1$ and $\Delta N2$ represent hystereses. Hystereses $\Delta N1$ and $\Delta N2$ are provided as described above, and it is configured not to change the drive method when the rotation speed changes in the hysteresis range. Thereby, the load against the control unit (microcomputer) can be reduced, and heavy use of hardware including inverter circuit 2 and synchronous motor 1 can be prevented so that the hardware can have an increased lifetime and increased reliability.

The values of foregoing hysteresis ranges $\Delta N1$ and $\Delta N2$ may be determined in advance in view of the range of variation of the rotation speed and the range of corresponding variation of the efficiency, or may be calculated by arithmetic in accordance with the control contents (information such as initial rotation speed and target rotation speed), when necessary. Further, the hysteresis ranges $\Delta N1$ and $\Delta N2$ may be equal to each other, or different from each other.

In the foregoing example, the inversion of the relationship occurs only at one point in speed range. However, the inversion may occur at two or more points. In the above example, the 120°-conduction drive is performed by PWM (Pulse Width Modulation), but another drive such as PAM (Pulse Amplitude Modulation) may be used for achieving the high efficiency characteristics, whereby similar effects can be achieved.

As described above, synchronous motor 1 can be driven by the optimum drive method, which can attain the optimum efficiency, in accordance with the rotation speed by performing the feedback control, in which the current rotation speed of the motor is detected, and is corrected to attain the target rotation speed by issuing a target rotation speed instruction, as well as the selection control for selecting the optimum drive method based on the current rotation speed information. Thereby, the motor drive with optimum efficiency can be achieved over the entire speed range or entire rotation speed range.

Second Embodiment

Figure 10:
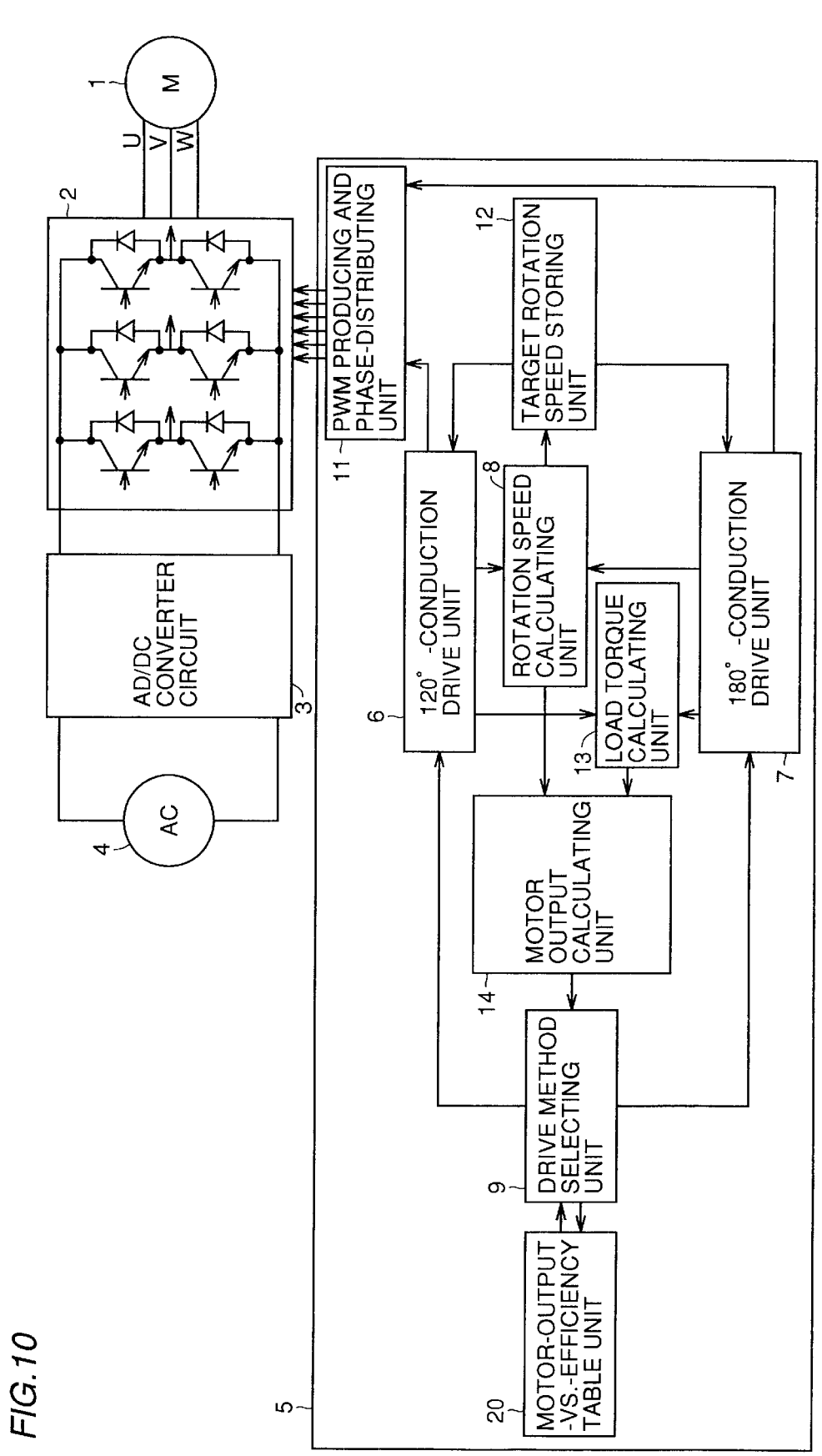
FIGS. 10 to 16 show structures of motor control devices of second to sixth embodiments of the invention, respectively.

Motor control of a second embodiment of the invention will now be described with reference to FIG. 10. In FIG. 10, control unit 5 includes 120°-conduction drive unit 6, 180°-conduction drive unit 7, rotation speed calculating unit 8, drive method selecting unit 9 for selecting the drive method achieving the optimum efficiency based on the motor output issued from a motor output calculating unit 14 and the table representing the relationship between the motor output and the efficiency, which are stored in motor-output-vs.-efficiency table unit 20, motor-output-vs.-efficiency table unit 20 which has already stored the relationship between the motor output and the efficiency in each drive method of synchronous motor 1, a load torque calculating unit 13 which calculates the load torque information of synchronous motor 1 which is an IPM motor, and motor output calculating unit 14 which calculates the motor output from the rotation speed information and the load torque information.

The control unit 5 is formed of a microcomputer. In this case, the respective components 6–12 described above are achieved by software. Instead of the software, the respective components in control unit 5 may be formed of hardware performing similar processing.

The AC voltage supplied from AC power supply 4 is converted by AC/DC converter 3 into a DC voltage, and is supplied to inverter circuit 2. Switching in respective drive elements such as transistors Tr and IGBTs forming inverter circuit 2 is performed with a desired duty under the control of PWM producing and phase-distributing unit 11 in control unit 5. Thereby, the respective phases of synchronous motor 1 receive the DC voltage via inverter circuit 2, and thereby synchronous motor 1 is driven.

Load torque calculating unit 13 receives information relating to the load torque from 120°-conduction drive unit 6 or 180°-conduction drive unit 7, and issues load torque information. For this load torque information, various method may be used. For example, a method of detecting it from a torque detector may be used. Alternatively, such a method may be used that a relationship between the coil current and the torque is stored in advance, and a coil load current is detected, e.g., by a current detector for calculating the torque.

Motor output calculating unit 14 calculates the motor output from the rotation speed information issued from rotation speed calculating unit 8 and load torque information issued from load torque calculating unit 13. The drive method achieving the optimum efficiency is selected in accordance with the motor output based on the motor output thus calculated and the information already stored in motor-output-vs.-efficiency table unit 20.

The conduction drive unit (i.e., 120°-conduction drive unit 6 or 180°-conduction drive unit 7) selected by drive method selecting unit 9 sends the voltage data to PWM producing and phase-distributing unit 11. PWM producing and phase-distributing unit 11 determines the duty ratio of the PWM signal based on the voltage data thus sent, and distributes the PWM signal to the respective drive elements forming inverter circuit 2 for issuing the instruction signal switching the respective drive elements.

The target rotation speed storing unit 12 compares the current rotation speed information received from rotation speed calculating unit 8 with the target rotation speed for calculating an error, and sends the error correction data for achieving the optimum speed to 120°-conduction drive unit 6 or 180°-conduction drive unit 7.

As described above, the current rotation speed is detected, and the control unit (or algorithm) is configured to perform the feedback control for correcting the speed in accordance with the instruction relating to the set target rotation speed as well as the select control for selecting the appropriate drive method based on the current rotation speed information and the load torque information so that synchronous motor 1 can be driven in the optimum drive method. Thereby, the synchronous motor can be driven with the optimum efficiency over the entire motor output range.

Third Embodiment

A motor control device according to a third embodiment of the invention will now be described with reference to FIG. 11. The control unit 5 shown in FIG. 11 includes 120°-conduction drive unit 6, 180°-conduction drive unit 7, rotation speed calculating unit 8, drive method selecting unit 9, rotation-speed-vs.-efficiency table unit 10, PWM producing and phase-distributing unit 11, target rotation speed storing unit 12, a current detecting unit 17 which detects a motor current flowing through a specific phase among the phases of motor coil terminals U, V and W, and produces current phase information, a voltage/current phase difference detecting unit 15 which detects the phase difference information from the current phase information issued from current detecting unit 17 and the voltage phase information issued from 180°-conduction drive unit 7, a phase difference storing unit 16 for storing a target phase difference, an arithmetic unit 30, and an induced voltage detecting unit 18 which detects induced voltages generated in the respective phases of motor coil terminals U, V and W.

The control unit 5 is formed of a microcomputer. In this case, the respective components 6–18 described above are achieved by software. Instead of the software, the respective components in control unit 5 may be formed of hardware performing similar processing. Current detecting unit 17 may be a so-called current sensor formed of a coil and a Hall element, a current transformer or the like.

120°-conduction drive unit 6 is used for continuing application of voltage in motor coil 4 for a period of 120 degrees. The currents thus applied have the waveforms already described with reference to FIG. 2. During unconduction periods 26u, 26v and 26w, i.e., when the coils are not conducted in the 120°-conduction drive method, induced voltage detecting unit 18 detects the voltage induced by magnets provided in the rotor. 120°-conduction drive unit 6 obtains the information issued from induced voltage detecting unit 18, and detects the phase of the rotor.

Voltage/current phase difference detecting unit 15 calculates the phase difference of the current with respect to the voltage based on the current phase information, which is obtained from current detecting unit 17 detecting the motor current flowing through a specific phase (W-phase in FIG. 11), and the voltage phase information issued from 180°-conduction drive unit 7.

Arithmetic unit 30 calculates an error between the phase difference issued from voltage/current phase difference detecting unit 15 and the target phase difference stored in phase difference storing unit 16.

180°-conduction drive unit 7 is used for continuing application of the voltage to the motor coils for a period of 180 degrees, and the waveforms employed in this conduction are the same as those already described with reference to FIG. 3. 180°-conduction drive unit 7 receives the error correction data achieving the optimum speed from arithmetic unit 30.

Target rotation speed storing unit 12 receives the current rotation speed information from rotation speed calculating unit 8, compares it with the target rotation speed, and sends the error correction data for achieving the appropriate speed to 120°-conduction drive unit 6 or 180°-conduction drive unit 7.

As described above, the current rotation speed is detected, and the control unit is configured to perform the feedback control for correcting the speed in accordance with the instruction relating to the set target rotation speed as well as the control for selecting the appropriate drive method based on the current rotation speed information. Thereby, synchronous motor 1 can be driven in the optimum drive method.

Further, 120°-conduction drive unit 6 is controlled by the induced voltage, and 180°-conduction drive unit 7 is controlled by the phase difference information, whereby synchronous motor 1 can be driven in the optimum method without using a specific position detector.

Fourth Embodiment

Figure 12:
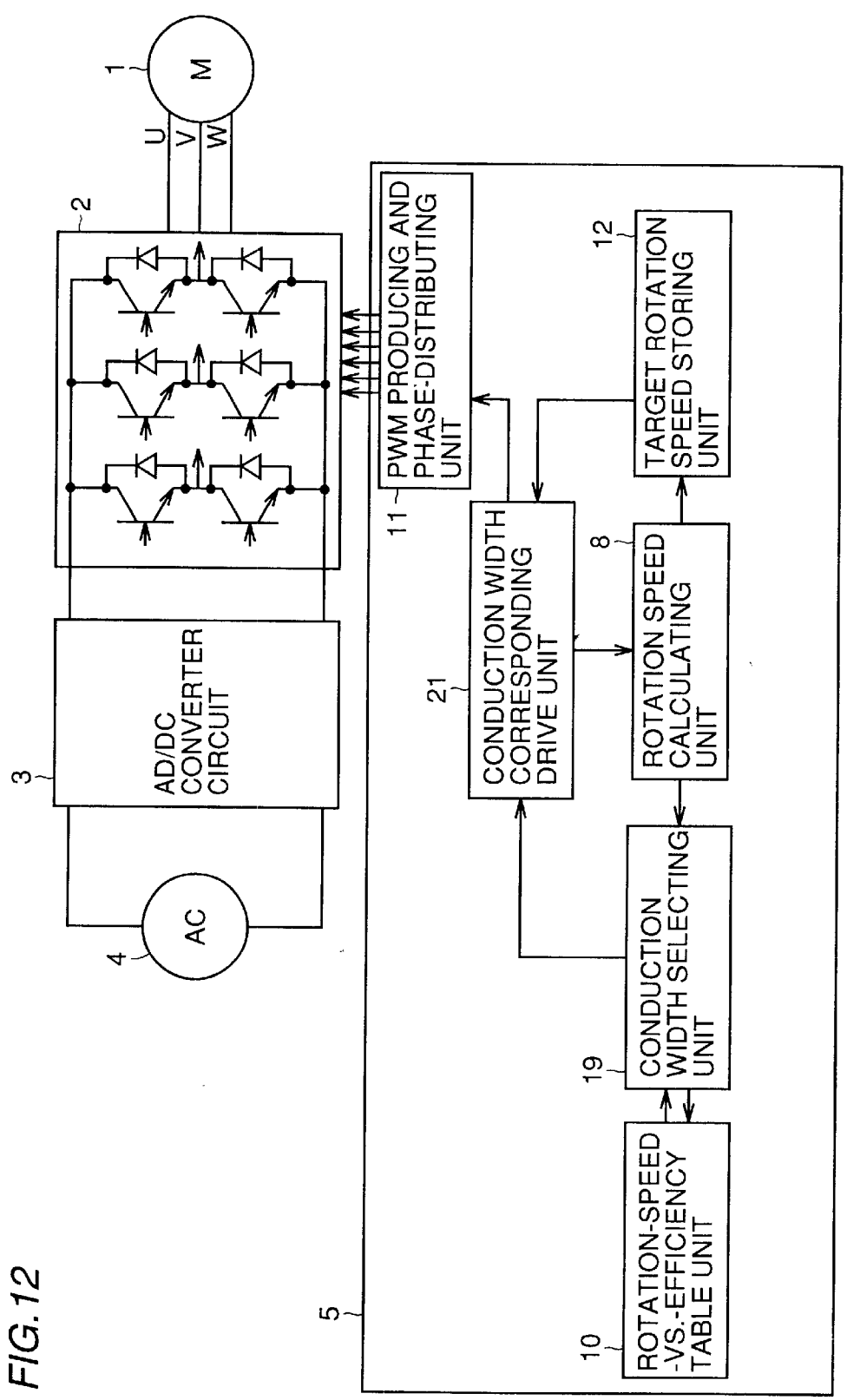

A motor control device of a fourth embodiment of the invention will now be described with reference to FIG. 12. The control unit 5 shown in FIG. 12 includes a conduction width corresponding drive unit 21, rotation speed calculating unit 8, a conduction width selecting unit 19, rotation-speed-vs.-efficiency table unit 10, PWM producing and phase-distributing unit 11 and target rotation speed storing unit 12.

The control unit 5 is formed of a microcomputer. In this case, the respective components described above are achieved by software. Instead of the software, the respective components in control unit 5 may be formed of hardware performing similar processing.

The conduction width corresponding drive unit 21 sets the period, for which a voltage is applied to the motor coil of a certain phase, to a value between 120 degrees and 180 degrees. The waveforms of the drive voltages applied to the other phases have the phase differences of 120 degrees and 240 degrees with respect to the above phase, respectively.

Rotation speed calculating unit 8 detects or calculates the rotation speed of synchronous motor 1 based on the rotation speed information relating to the rotation speed and sent from conduction width corresponding drive unit 21. This rotation speed information may be obtained by various methods such as a method of calculating the speed from an induced voltage, a method of using a rotation detector such as a sensor or a method of using an external center detecting circuit.

Rotation-speed-vs.-efficiency table unit 10 has already stored the table representing the relationship between the rotation speed and the efficiency of synchronous motor 1 in the drive method of each conduction width. Conduction width selecting unit 19 selects the conduction width achieving the optimum efficiency in accordance with the current rotation speed based on the rotation speed issued from rotation speed calculating unit 8 and the information representing the relationship between the rotation speed and the efficiency, which is stored in rotation-speed-vs.-efficiency table unit 10.

When the conduction width selecting unit 19 selects the conduction width, conduction width corresponding drive unit 21 issues the voltage data corresponding to the selected conduction width to PWM producing and phase-distributing unit 11. PWM producing and phase-distributing unit 11 determines the duty ratio of the PWM signal based on the voltage data, and distributes the PWM signal to the respective drive elements included in inverter circuit 2 for issuing instruction signals switching the respective drive elements.

As described above, the current rotation speed is detected, and the control unit is configured to perform the feedback control for performing the speed correction in accordance with the instruction indicating the set target rotation speed as well as the select control for selecting the drive method of the optimum conduction width based on the current rotation speed information. Thereby, synchronous motor 1 can be driven in the drive method of the optimum conduction width. This allows more efficient driving of the synchronous motor.

Such a structure may be employed that load torque calculating unit 13 and motor output calculating unit 14 are additionally employed, motor-output-vs.-efficiency table unit 20 is arranged in place of rotation-speed-vs.-efficiency table unit 10, and the output of motor output calculating unit 14 is sent to conduction width selecting unit 19. In this case, synchronous motor 1 is driven with the optimum conduction width in accordance with the motor output.

Fifth Embodiment

Figure 13:
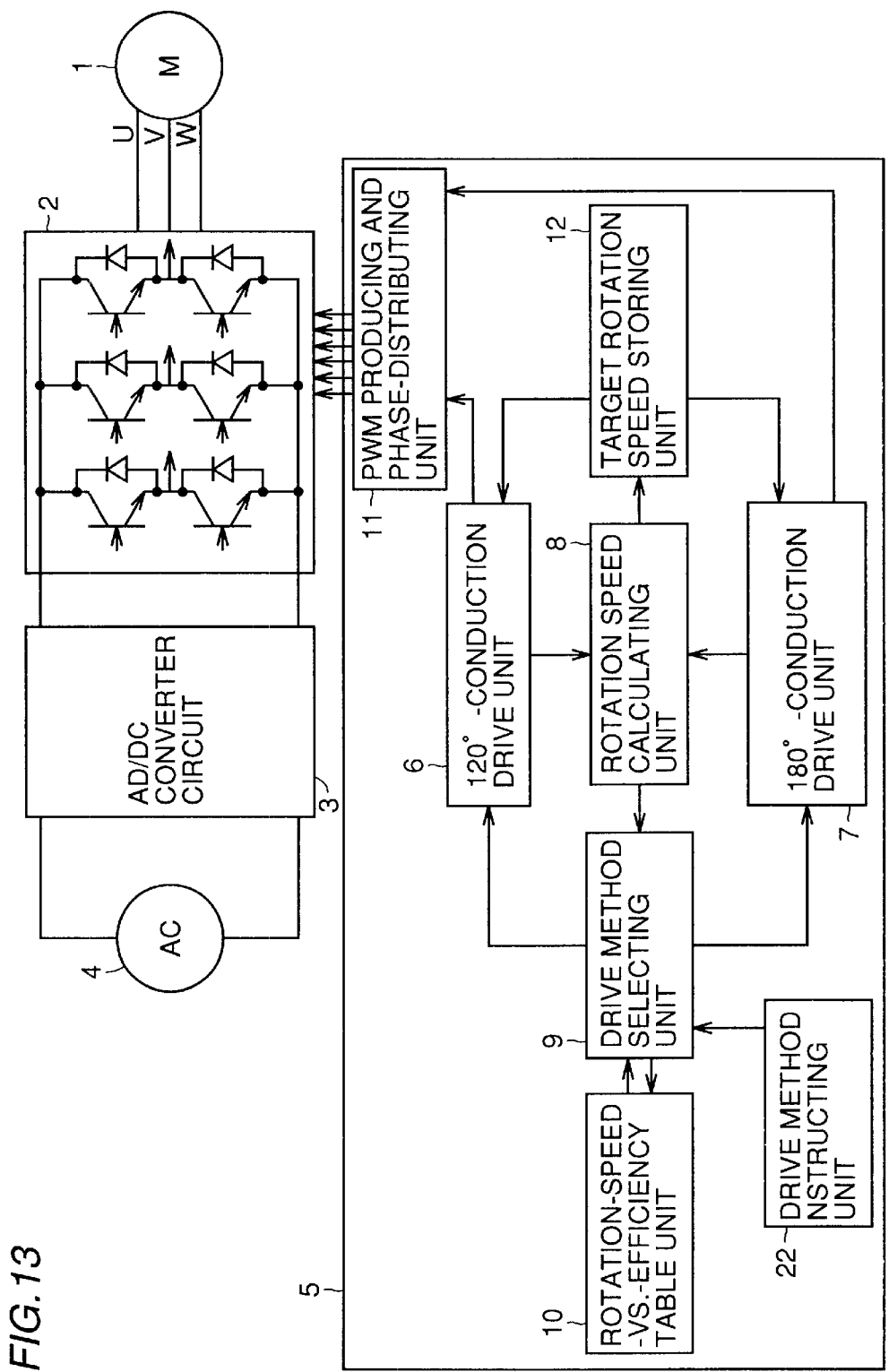

A motor control device of a fifth embodiment of the invention will now be described with reference to FIG. 13. The control unit 5 shown in FIG. 13 includes 120°-conduction drive unit 6, 180°-conduction drive unit 7, rotation speed calculating unit 8, drive method selecting unit 9, rotation-speed-vs.-efficiency table unit 10, PWM producing and phase-distributing unit 11, target rotation speed storing unit 12 and a drive method instructing unit 22.

The control unit 5 is formed of a microcomputer. In this case, the respective components described above are achieved by software. Instead of the software, the respective components in control unit 5 may be formed of hardware performing similar processing.

Drive method instructing unit 22 is a distinctive unit in the fifth embodiment of the invention, and controls the operation in drive method selecting unit 9. More specifically, drive method selecting unit 9 selects either the 120°-conduction drive method or the 180°-conduction drive method based on an interrupt signal sent from drive method instructing unit 22 in addition to the output of rotation speed calculating unit 8.

For example, it may be necessary to execute forcedly the 180°-conduction drive method for noise reduction. In this case, the interrupt signal indicating execution of the 180°-conduction drive is sent to drive method electrode unit 9 independently of the current drive method. At this point of time, if the 180°-conduction drive method is being executed, the current or present state is maintained. If the 120°-conduction drive method is being executed, the method is changed to the 180°-conduction drive method.

For releasing the drive forced by the foregoing interrupt signal, the drive method instructing unit 22 issues a signal for releasing the interruption. Thereby, drive method selecting unit 9 can select the drive method in accordance with the output of rotation speed calculating unit 8.

As described above, the current rotation speed is detected, and it is possible to perform the feedback control for correcting the speed in accordance with the set target rotation speed instruction, the control for selecting the optimum drive method based on the current rotation speed, and the processing of arbitrarily selecting the drive method in accordance with the external instruction. Thereby, synchronous motor 1 can be driven with optimum efficiency by the arbitrary drive method.

Figure 14:
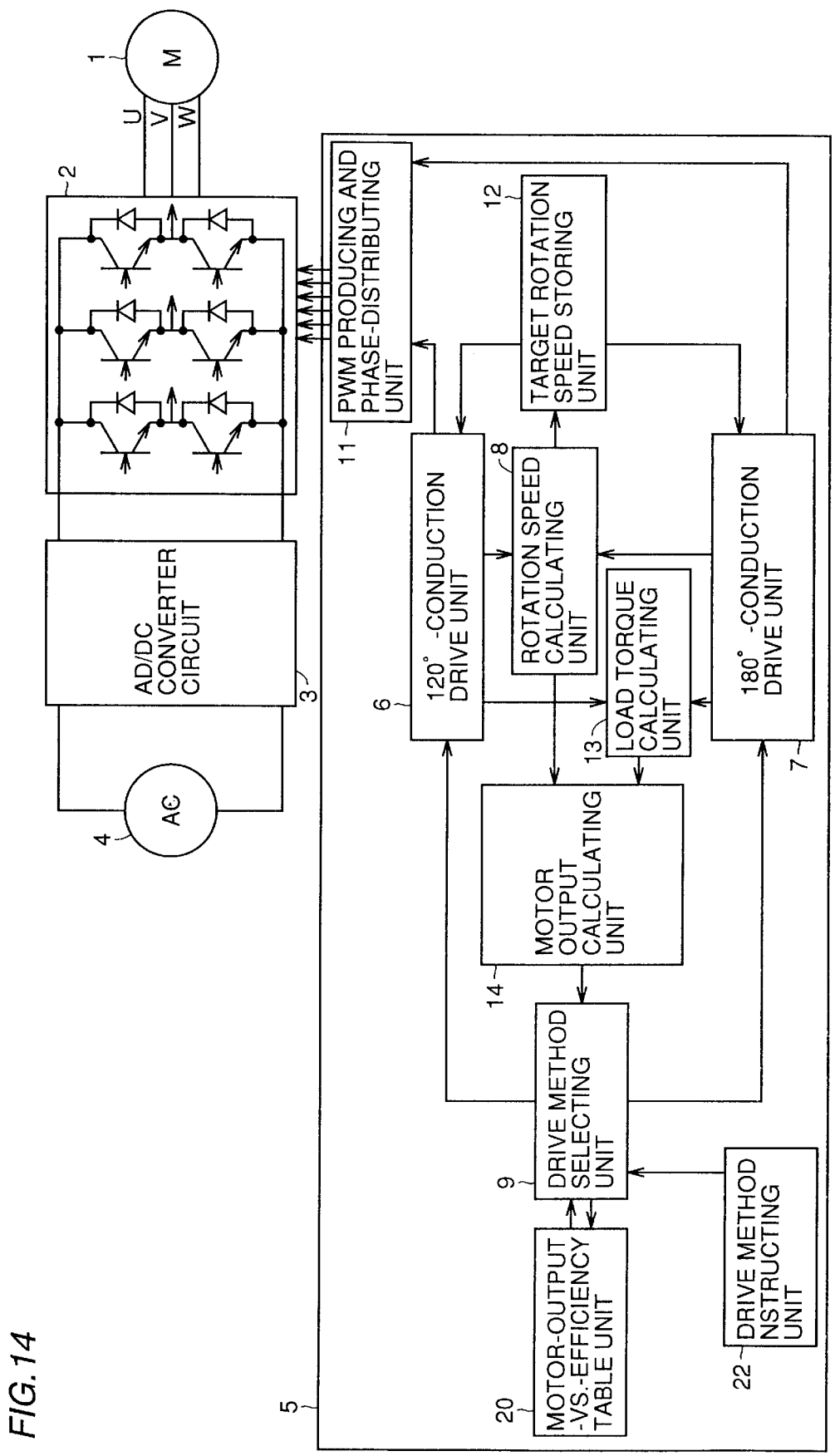

FIG. 14 shows another example of the structure of the motor control device according to the fifth embodiment of the invention. Control unit 5 shown in FIG. 14 includes 120°-conduction drive unit 6, 180°-conduction drive unit 7, rotation speed calculating unit 8, drive method selecting unit 9, motor-output-vs.-efficiency table 20, PWM producing and phase-distributing unit 11, target rotation speed storing unit 12, load torque calculating unit 13, motor output calculating unit 14 and drive method instructing unit 22.

According to the structure shown in FIG. 14, the speed can be corrected in accordance with the set target rotation speed instruction, and the drive method can be selected to achieve the optimum drive in accordance with the current motor output or can be selected arbitrarily in accordance with the external instruction.

Figure 11:
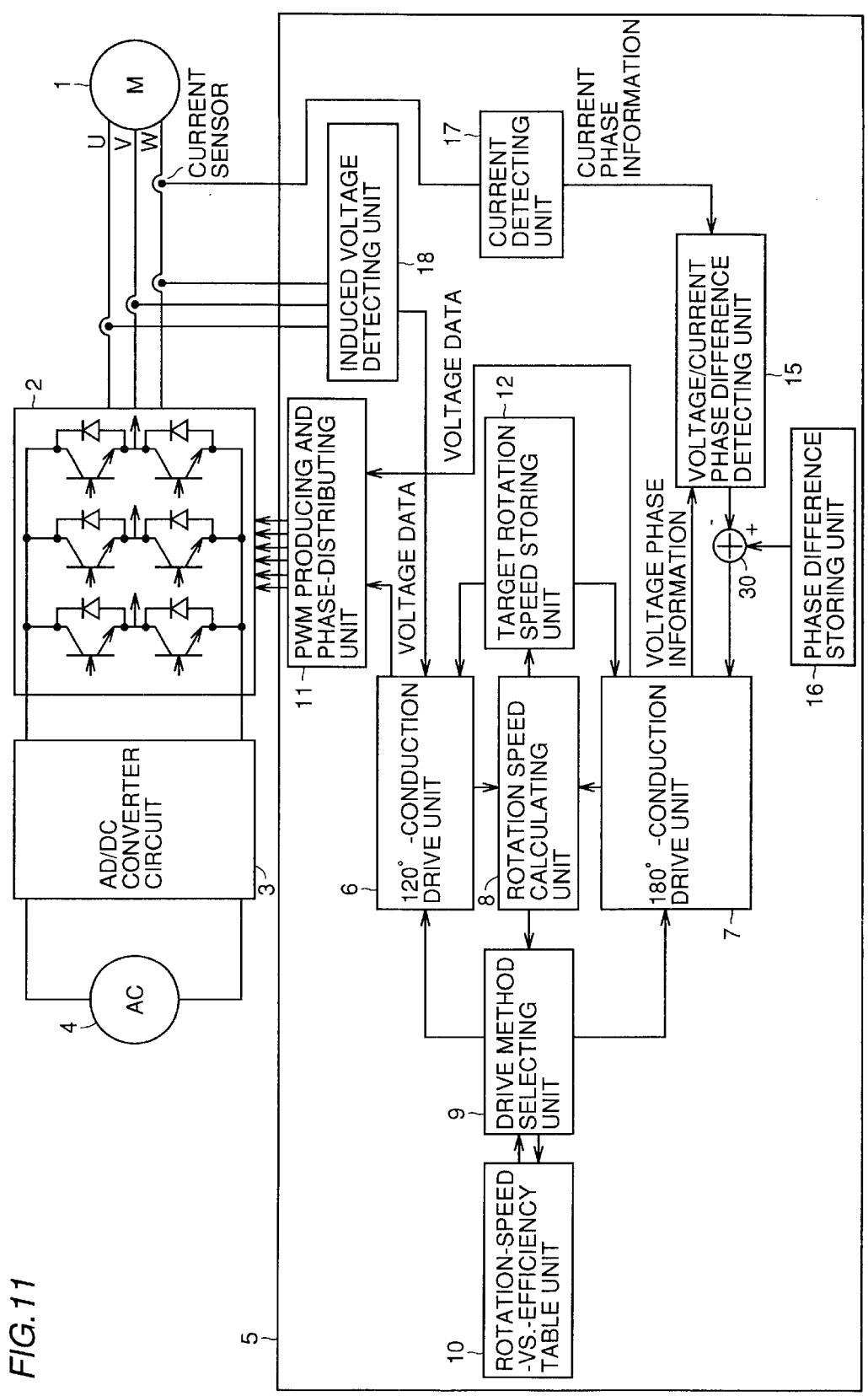

Further, the structure shown in FIG. 11 may likewise be provided with drive method instructing unit 22 for drive method selecting unit 9 so that the speed can be corrected in accordance with the set target rotation speed instruction, and the drive method can be selected to achieve the optimum drive in accordance with the current motor state or can be selected arbitrarily in accordance with the external instruction.

Figure 15:
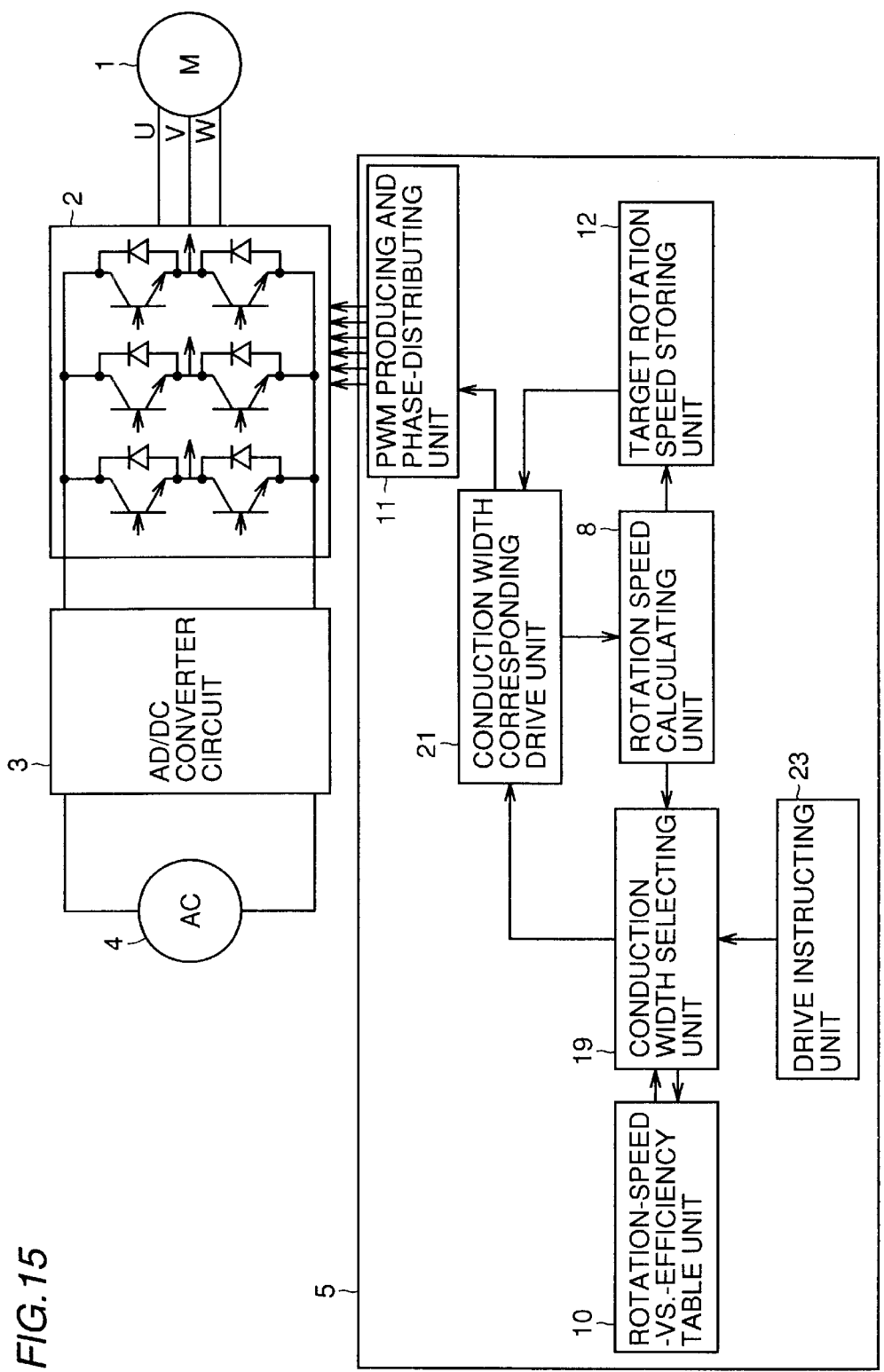

FIG. 15 shows still another example of the structure of the motor control device according to the fifth embodiment of the invention. In FIG. 15, a drive instructing unit 23 is provided for conduction width selecting unit 19. Drive instructing unit 23 receives an external instruction, and issues an interrupt signal for forcedly setting the corresponding conduction width or an interrupt releasing signal for releasing the interruption. Thereby, the speed can be corrected in accordance with the set target rotation speed instruction, and the conduction width can be selected to be optimum in accordance with the current motor state, or can be selected arbitrarily in accordance with the external instruction.

The structure shown in FIG. 15 may be further provided with load torque calculating unit 13 and motor output calculating unit 14, and rotation-speed-vs.-efficiency table unit 10 may be replaced with motor-output-vs.-efficiency table unit 20 so that the output of motor output calculating unit 14 can be issued to conduction width selecting unit 19. Thereby, the drive instructing unit can likewise be provided for conduction width selecting unit 19.

In the fifth embodiment described above, the control is performed in connection with the 180° forced drive. In connection with the 120° forced drive, the control can be likewise performed to set forcedly the drive method in similar manners.

Sixth Embodiment

Figure 16:
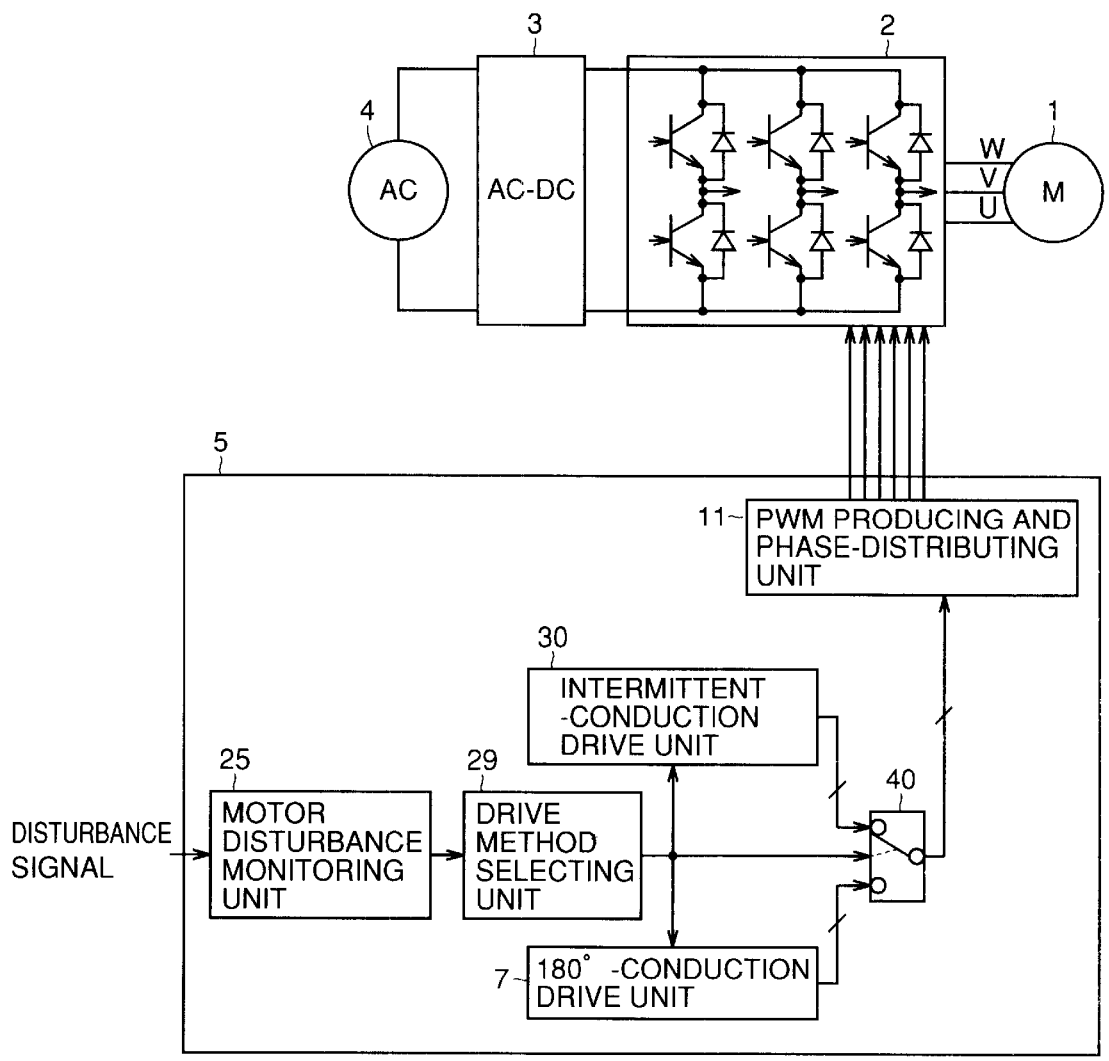

The motor control device according to a sixth embodiment of the invention will now be described with reference to FIG. 16. In FIG. 16, a motor control device includes inverter circuit 2 for driving synchronous motor 1, converter circuit 3 (bearing "AC-DC" in the figure) for converting the AC power supply to the direct current, and supplying it to inverter circuit 2, AC power supply 4 and a control unit 5 for driving and controlling synchronous motor 1.

In FIG. 16, the motor control device includes a motor disturbance monitoring unit 25 which receives a signal representing a disturbance from synchronous motor 1 or inverter circuit 2, a drive method selecting unit 29 which determines the drive method in accordance with the output of motor disturbance monitoring unit 25, an intermittent-conduction drive unit 30 which controls, e.g., setting of the conduction timing and the reference value of the drive voltage (PWM duty) for performing the intermittent-conduction drive of synchronous motor 1 with an unconduction period smaller than 180 degrees in conduction angle, 180°-conduction drive unit 7 for controlling the setting of the conduction timing and the setting of the drive voltage (PWM duty) reference value, a switch 40 for supplying the PWM duty reference value and the conduction timing according to the selected drive method to PWM producing and phase-distributing unit 11, and PWM producing and phase-distributing unit 11 for producing and outputting the PWM signal, which is used for driving each motor drive element of inverter circuit 2, for each drive element.

The power supply to inverter circuit 2 is of a so-called PAM type, which is a variable power supply method.

In accordance with disturbances of synchronous motor 1 or inverter circuit 2 detected by motor disturbance monitoring unit 25, drive method selecting unit 29 determines whether synchronous motor 1 is to be driven in the intermittent-conduction drive method or the 180°-conduction drive method.

The signals, which are supplied to motor disturbance monitoring unit 25 and indicate the disturbances of, e.g., synchronous motor 1 or inverter circuit 2, affect the control variables in the motor control and drive, and thus act as disturbances. These are, for example, the DC power supply voltage which is the power supply of each drive element in inverter circuit 2, the rotation speed of synchronous motor 1, the load torque generated in synchronous motor 1, the motor current of the motor coil which varies in accordance with the above conditions, and the phase difference between the drive voltage and the motor current.

It is not necessary to detect directly these conditions, and other disturbance factors or accompanying disturbance information other than the foregoing information may be detected. In many cases, the disturbance information includes parameters, of which variations from steady-state values are important, and therefore it is desired to detect variations of values thereof by motor disturbance monitoring unit 25.

The motor control device according to the sixth embodiment of the invention controls the motor driving by selecting the appropriate drive method (i.e., the method achieving a good control performance) every time the disturbance is applied, and in other words by selecting the drive method not causing such a disadvantage that may stop the motor due to the disturbance. Thereby, the motor driving with high reliability and high efficiency can be achieved.

For improving the efficiency and suppressing the torque variations, vibrations and noises, it is desired to perform the 180°-conduction drive by sinusoidal conduction which can achieve smooth change in drive waveform.

Various drive waveforms may be employed for the intermittent-conduction drive provided that the conduction angle is smaller than 180 degrees so that an unconduction period is provided in the drive waveform, and a counter electromotive voltage generated during the above unconduction period can be detected. For example, since the 120°-conduction drive is the complete two-phase conduction, and allows rectangular wave conduction, it has an advantage that the drive waveform to be supplied to each phase can be produced easily. Since the counter electromotive voltage can be detected for a long period, the detection can be performed with improved reliability.

Figure 17:
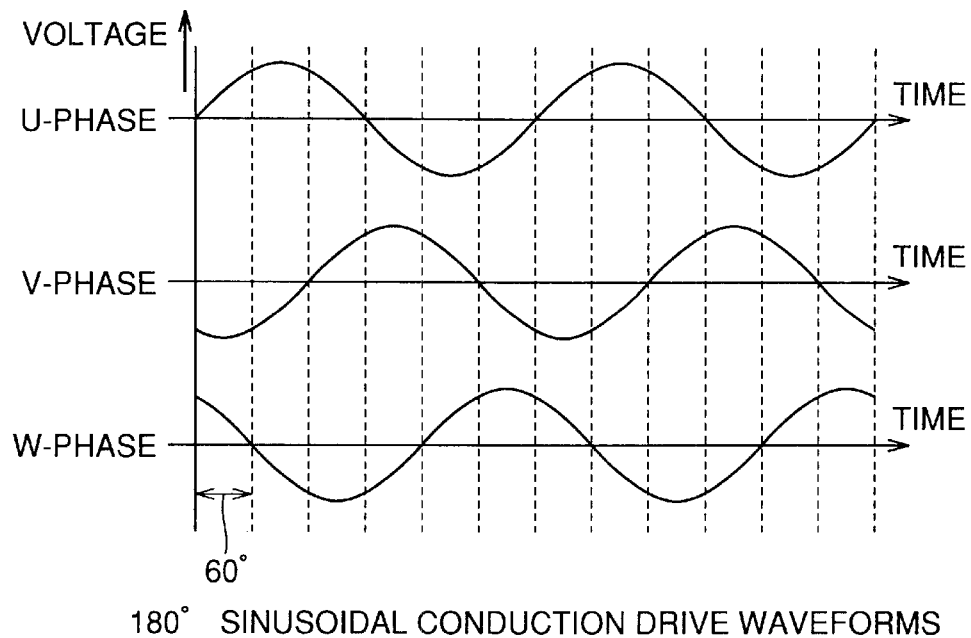
FIG. 17 shows drive waveforms in a sinusoidal conduction which is an example of 180°-conduction drive.
Figure 18:
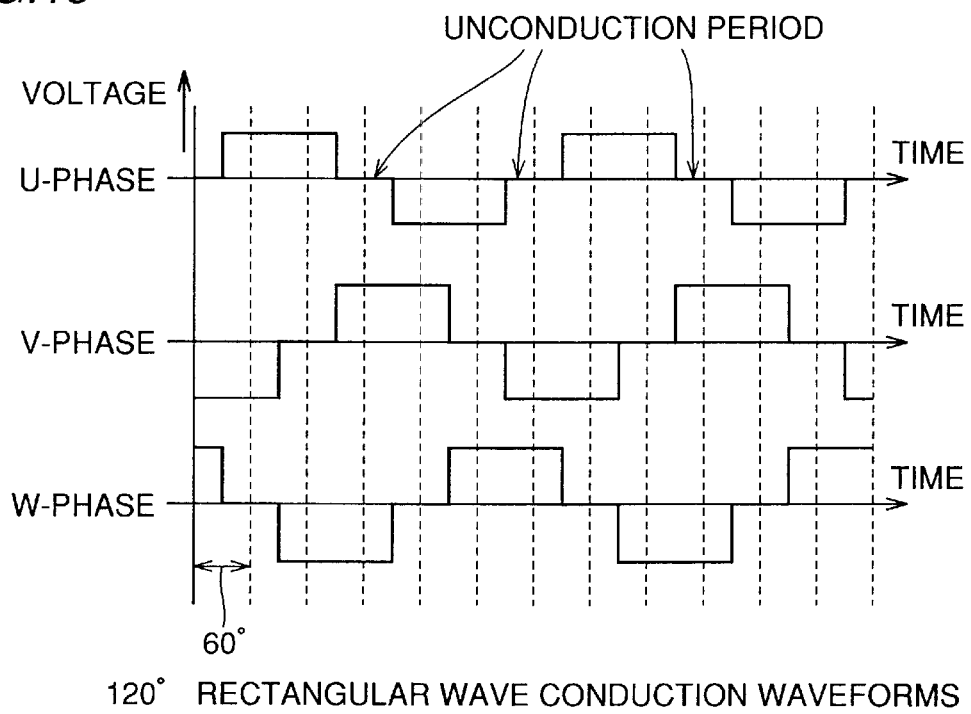
FIG. 18 shows drive waveforms in a rectangular wave 120°-conduction which is an example of intermittent-conduction drive.
Figure 19:
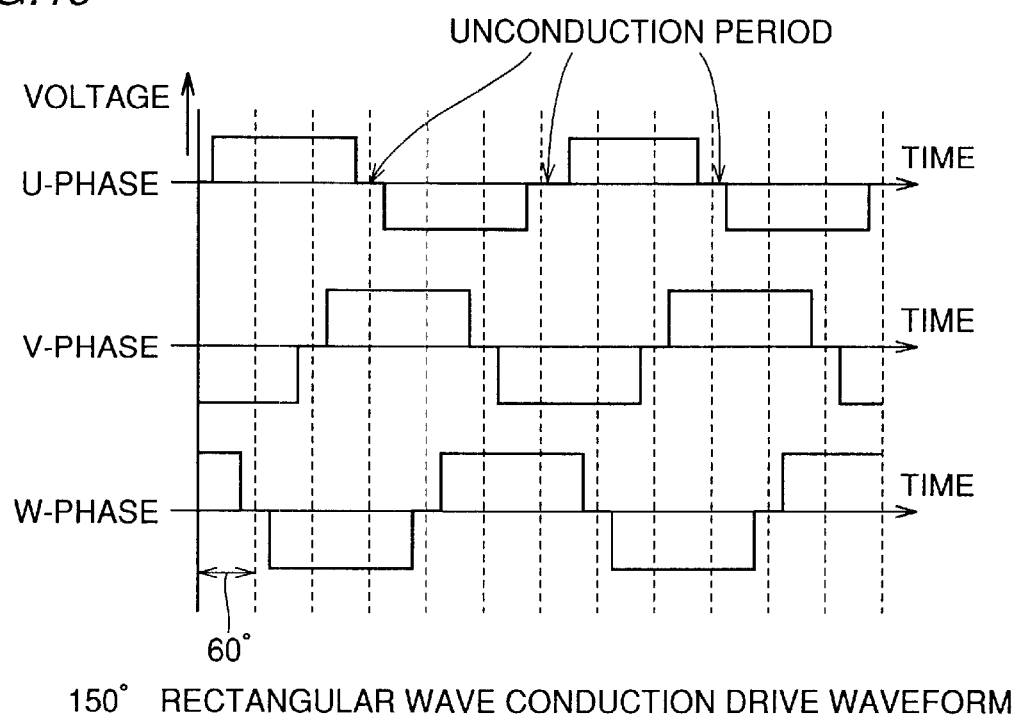
FIG. 19 shows drive waveforms in 150°-conduction drive which is another example of the intermittent-conduction drive.

Referring to FIGS. 17 to 19, drive waveforms in the respective phases will now be described. In FIGS. 17 to 19, a signal (output of PWM producing and phase-distributing unit 11) on each coil terminal for driving the drive element of inverter circuit 2 is shown in the form of an analog value. In the actual conduction period, the drive waveform is the PWM waveform, and the PWM duty is changed during the conduction period. In each figure, the abscissa gives the coil conduction electrical angle, and the ordinate gives the voltage. The coils of three phases, i.e., U-, V- and W-phases of the motor are to be driven.

In the 180°-conduction drive method, as shown in FIG. 17, each phase is conducted by the sinusoidal waveform conduction. Using the U-phase coil as the reference, the conduction waveforms for the V- and W-phases have the phase differences of 120 degrees and 240 degrees with respect to the conduction waveform for the U-phase, respectively.

In the 120° rectangular wave conduction drive method, as shown in FIG. 18, the rectangular wave conduction is performed in each phase for a period of 120 degrees, and the conduction is stopped for the remaining period of 60 degrees. Using, e.g., the U-phase as the reference, the V- and W-phases have the phase differences of 120 degrees and 240 degrees with respect to the U-phase, respectively.

In the 150° rectangular wave conduction drive method, as shown in FIG. 19, the rectangular wave conduction is performed in each phase for a period of 150 degrees, and the conduction is stopped for the remaining period of 30 degrees.

The actual motor current waveform, which appears on the U-phase coil terminal when a disturbance occurs during the 180°-conduction drive, will now be described with reference to FIGS. 20 and 21. In experiments shown in FIGS. 20 and 21, the 180°-conduction drive with the sinusoidal wave was performed. The motor rotation speed was 3000 rpm and the steady load torque was about 1.5 Nm.

Figure 20:
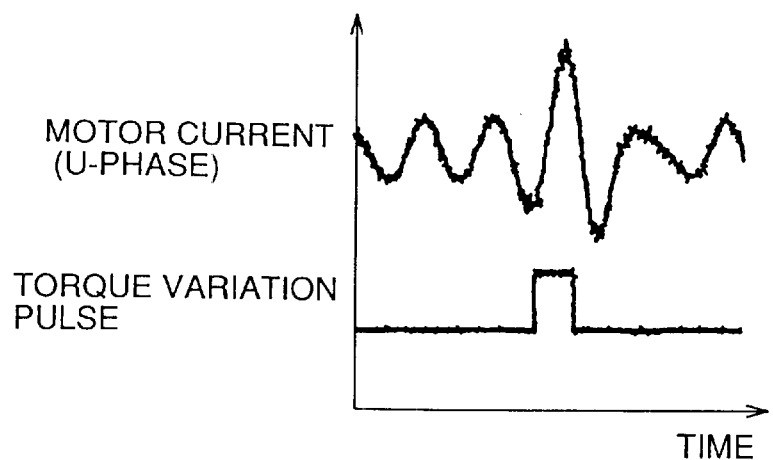
FIG. 20 shows motor current waveforms appearing when a pulse for generating torque vibrations is applied.

FIG. 20 shows a motor current waveform which appears when a pulse causing a torque vibration of about 0.5 Nm is applied. As shown in FIG. 20, the amplitude of the motor current waveform excessively increases when the torque variations occur, and further the sinusoidal waveform is also disturbed immediately after the end of variation.

Figure 21:
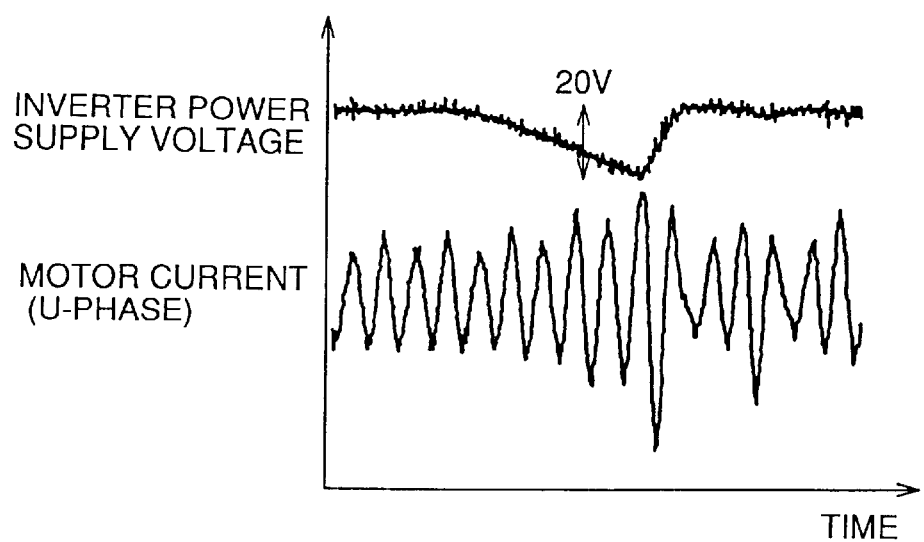
FIG. 21 shows motor current waveforms appealing when variations occur in a direct power supply voltage of an inverter circuit 2.

FIG. 21 shows the motor current waveform which appears when the DC power supply voltage of inverter circuit 2 varies. According to the experiment shown in FIG. 21, the DC power supply voltage varies about 20 V. As shown in FIG. 21, when the DC power supply voltage changes, the motor current is disturbed similarly to the case where the load torque changes.

This is because the torque variation causes an instantaneous change in conduction timing, and the drive was not performed in accordance with the accurate conduction timing. In both the experiments shown in FIGS. 20 and 21, only the lowering in efficiency or the like is caused by the facts that the control cannot follow the adverse effect caused by disturbance variations, and that the drive cannot be performed in accordance with the appropriate conduction timing. However, if the amounts of the respective disturbance variations increase, or a long time elapses before the end of variations, the motor cannot continue the rotation, and therefore stops.

This is due to the fact that the respective drive methods of the 180°-conduction drive have such features that the control robustness is low due to the difficulty in control as described before, and the influence by the disturbance is large.

Although the influence by the disturbance is large, the 180°-conduction drive, and particularly the sinusoidal wave 180°-conduction drive has such advantages that the motor noises and vibrations are low owing to the smoothness of the drive waveform, and the efficiency can be improved owing to the high rate of winding usage. If the foregoing disturbance is not present, therefore, it is desired to perform the motor drive by the 180°-conduction drive achieving high rotational performance.

According to the intermittent-conduction drive such as 120°-conduction drive, an off period for which the motor current is not supplied is employed, and the counter electromotive voltage which purely represents the motor rotational position is detected. Therefore, the conduction timing does not change to a large extent even when disturbances such as torque variations occur, although variations in rotation speed may occur. Compared with 180°-conduction drive, therefore, the possibility of occurrence of disadvantages such as stop of the motor, e.g., due to the disturbance is low, and the reliability relating to the motor driving is high.

Accordingly, the motor control device of the sixth embodiment of the invention selects the 180°-conduction drive achieving the high rotation performance during the steady state, in which the disturbance is not present or small. Also, the intermittent-conduction drive which can achieve the high reliability is selected during the unusual state, in which the disturbance is detected or is large.

Thereby, the motor drive with the high efficiency, low noises and low vibrations can be achieved in the steady state, and the motor drive with high reliability can be achieved without causing disadvantages such as stop of the motor in the unusual state.

The contents of processing of motor disturbance monitoring unit 25 and drive method selecting unit 29 will now be described with reference to flowcharts of FIGS. 22 to 25. The processing in these flowcharts is performed in accordance with the timing of production of the drive voltage (PWM duty) reference value, or in every PWM carrier period, and usually the processing starts in response to the interruption by the control microcomputer.

Figure 22:
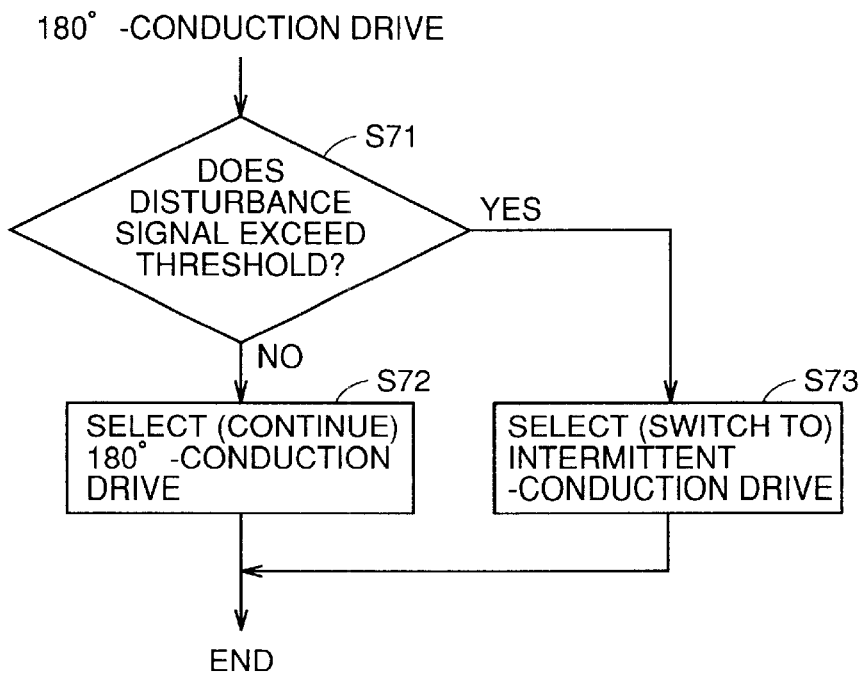
FIGS. 22 to 24 are flowcharts showing flows of processing in a motor disturbance monitoring unit 25 and a drive method selecting unit 9 during intermittent-conduction drive, respectively.

When the 180°-conduction drive is being performed, the processing is performed as follows. Referring to FIG. 22, a disturbance signal is compared with a threshold data representing the allowed variation amount in a step S71.

The above disturbance signal may be a signal representing the foregoing load torque variations, a signal representing the power supply voltage or the like. The signal representing the variations in load torque may be a signal sent from a torque sensor, a signal representing variations in amplitude of the motor current shown in FIG. 20, a signal representing a phase difference of the motor current with respect to the drive voltage or a signal representing rotation speed variations caused due to torque variations. In the case where the rotation speed variation information is applied, it is possible to deal with failure in motor conduction during excessive acceleration or deceleration of the synchronous motor. The signal representing the power supply voltage may be a signal representing a voltage value obtained by resistance-division of the DC power supply, or a signal of a value representing an AC power supply voltage.

Only one signal may be applied as the foregoing disturbance signal. Alternatively, two or more signals may be applied as the disturbance signals, whereby the motor drive can be monitored more strictly.

The threshold data contains a value representing the variation amount, which does not cause significant lowering in efficiency of the 180°-conduction drive due to the disturbance, or does not stop the motor. In the examples of results shown in FIGS. 20 and 21, the load torque variation can be set to a value corresponding to 0.5 Nm, which can maintain the rotation of motor, and the DC power supply voltage variation can be set to a value corresponding to 20V.

The threshold data may vary depending on the steady-state rotation speed and the steady-state load torque, and may be switched between different values depending on the rotation conditions so that the conduction drive selection can be performed more effectively. Further, the threshold data may be used as a rate of the amount of variation with respect to the steady value, and this amount of variation may be compared with the threshold data. Thereby, the drive method can be precisely switched regardless of the rotation conditions of the motor, and the reliability of the drive switching can be improved.

The comparing processing in step S71 may be configured to detect the fact that the results of comparison continue several times so that the influence by detected noises may be removed, whereby the reliability can be further improved.

In step S71, when the disturbance signal does not exceed the threshold data, the processing moves to a step S72. In step S72, it is determined that the disturbance is small, and the 180°-conduction drive is allowed in the current or present state. Therefore, a signal for continuing the 180°-conduction drive is issued.

When the disturbance signal exceeds the threshold data, the processing moves to a step S73. In step S73, it is determined that the disturbance is large, and the 180°-conduction drive is impossible in the current state. Therefore, processing (switching) for change to the intermittent-conduction drive, which will be described later, is performed. Then, the processing ends.

Figure 26:
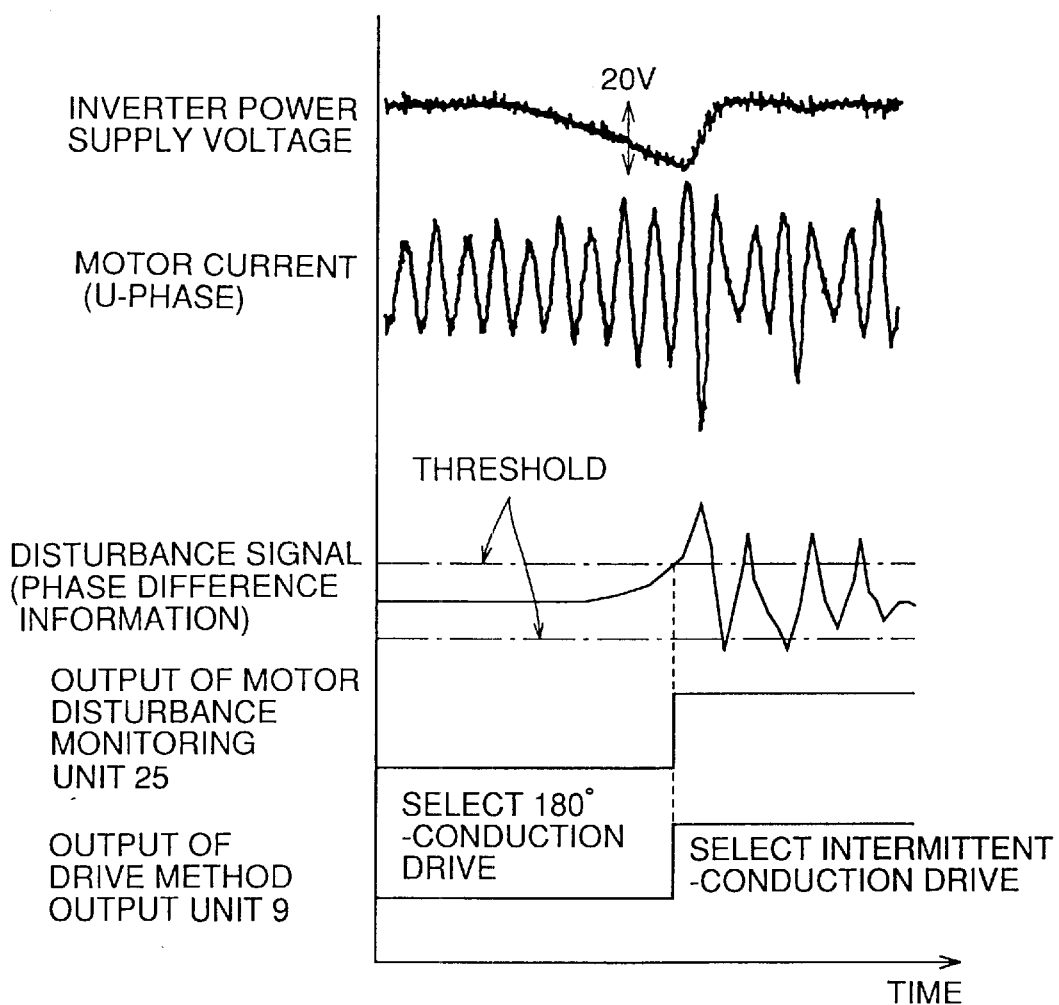
FIG. 26 shows outputs issued from the motor disturbance monitoring unit 25 and the drive method selecting unit 9 at the time of change in power supply voltage.

The contents of the foregoing processing will be described below with reference to FIG. 26. In FIG. 26, it is assumed that the information of phase difference of the motor current with respect to the drive voltage is used as the disturbance signal. This can be the efficient method when controlling the motor drive based on the phase difference, because the phase difference information can be used as the disturbance signal.

FIG. 26 shows the states which appear when the power supply voltage changes, and more specifically shows the power supply voltage waveform, motor current waveform, information serving as the disturbance signal and representing the phase difference of the motor current with respect to the drive voltage, output of motor disturbance monitoring unit 25, and the state of selection of the drive method selecting unit 29.

As the disturbance occurs, the phase difference information changes. Motor disturbance monitoring unit 25 changes its output when the phase difference information exceeds the set threshold data. Drive method selecting unit 9 issues a signal for selecting the drive method in response to the change in output of motor disturbance monitoring unit 25.

As the simplest structure, motor disturbance monitoring unit 25 may be formed of a comparator, which has a function of holding the output value for a constant period, and can make a comparison between the disturbance signal and the threshold data. Motor disturbance monitoring unit 25 may be additionally provided with a structure, e.g., for averaging the results of comparison, whereby the accuracy can be improved. Processing by a similar structure can be performed for the return from the intermittent-conduction drive to the 180°-conduction drive, as will be described later.

Figure 23:
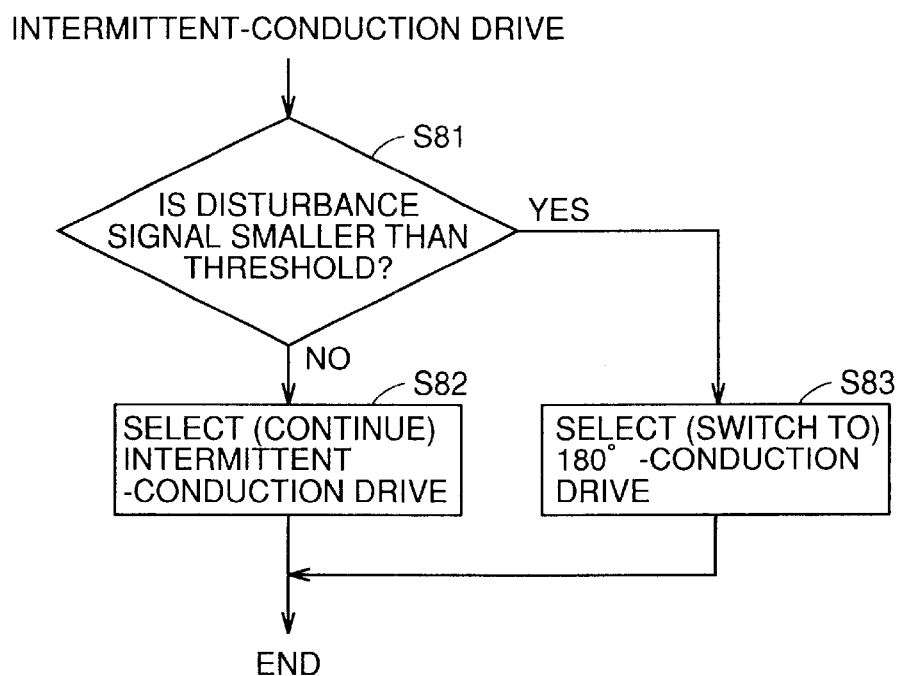

When the intermittent-conduction drive is being performed, processing is performed as described below. Referring to FIG. 23, it is determined in a step S81 whether the disturbance signal becomes smaller than the value represented by the threshold data or not. The disturbance signal and the threshold data are the same as those already described.

When the disturbance signal does not fall within the threshold data, processing in a step S82 starts. In step S82, it is determined that the disturbance is large in the current state, and therefore a signal for continuing the intermittent-conduction drive is issued.

When the disturbance signal falls within the threshold data, processing in a step S83 starts. In step S83, it is determined that the disturbance is small in the current state, and therefore processing (switching) for returning to the 180°-conduction drive, which will be described later, is performed. Thereby, the processing ends.

Figure 24:
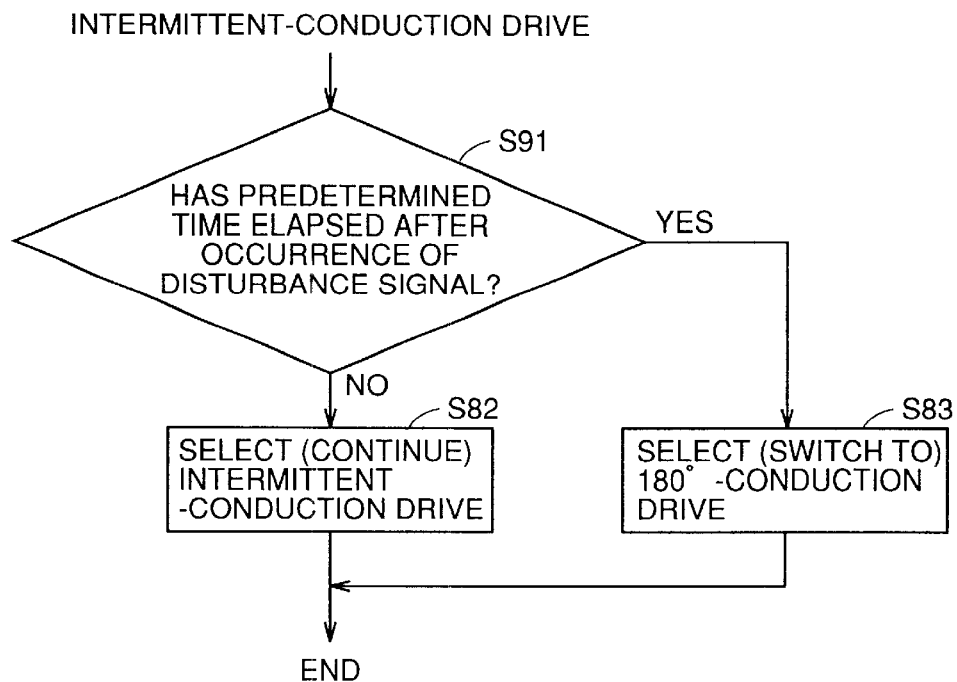

Another example of the processing during the intermittent-conduction drive will now be described with reference to FIG. 24. The processing shown in FIG. 24 includes a step S91 instead of step S81 shown in FIG. 23. In step S91, it is determined whether a predetermined time has elapsed after occurrence of the disturbance signal. If the predetermined time has elapsed after occurrence of the disturbance signal, the processing moves to step S83 for performing processing (switching) of return to the 180°-conduction drive. If the predetermined time has not elapsed after occurrence of the disturbance signal, the processing moves to step S82 for selecting (continuing) the intermittent-conduction drive.

In general, the disturbance occurs instantaneously at the time of instant power-off or switching of load. After this, the normal state is recovered or new values are held in many cases. Thus, the steady state is restored after the instantaneous variations stop. Accordingly, processing may be performed to resume the 180°-conduction drive after elapsing of a constant period of, e.g., 2 seconds.

As described above, the load torque, rotation speed, power supply voltage or signals accompanying thereto are monitored, and the amount of variations thereof is compared with the allowed value (threshold data). Thereby, the processing is performed to select the appropriate drive methods, and more specifically, is performed to select the 180°-conduction drive in the steady state causing less disturbance, and to select the intermittent-conduction drive in the unusual state causing large disturbances. Thereby, it is possible to prevent stop of the motor or other problem due to occurrence of disturbances such as variations in power supply voltage (e.g., instantaneous power-of, and changes or variations in motor rotation speed as well as variations in load torque, motor current and phase difference between the drive voltage and motor current, and it is possible to achieve the motor driving with high efficiency, low noises, low vibrations and high reliability.

Figure 25:
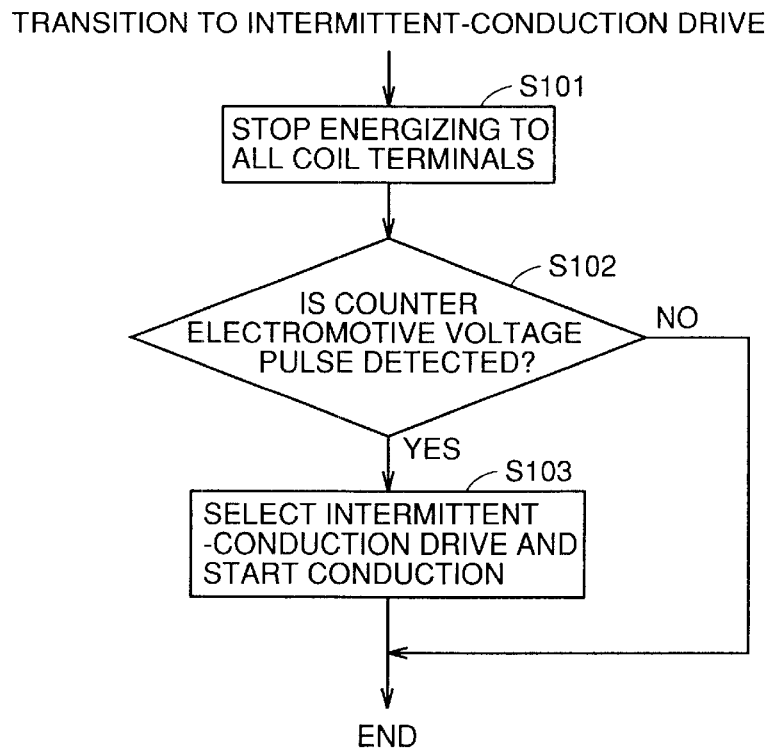
FIG. 25 is a flowchart showing a flow of processing during transition from 180°-conduction drive to intermittent-conduction drive.

Then, description will be made on step S73 for transition to the intermittent-conduction drive and step S83 for transition to the 180°-conduction drive. FIG. 25 shows processing in step S73 for transition from the 180°-conduction drive to the intermittent-conduction drive. In a step S101, conduction to all the coil terminals of the synchronous motor is stopped. This is for detecting the pure counter electromotive voltage by turning off all the coil terminals, and thereby detecting the accurate motor rotational position, although the counter electromotive voltage cannot be detected accurately from the coil terminals during the 180°-conduction drive because there is no unconduction period.

In step S102, the counter electromotive voltage is detected for detecting input of counter electromotive voltage pulse. This detection of the counter electromotive voltage is repeated until the pulse input occurs.

For accurately performing the rotational position detection while completely removing the influence by the coil terminal voltage due to the 180°-conduction drive, the pulse input may be detected, e.g., two times, and the accuracy can be improved by performing the second detection as the accurate pulse detection. The accuracy increases with increase in times of detection, and the motor is powered off during this detection. Accordingly, excessive times of detection may cause stop of the motor. According to an experiment, optimum conditions could be achieved by performing the detection, e.g., two times.

When the counter electromotive voltage pulse is detected, the processing moves to a step S103. In step S103, the intermittent-conduction drive for switching the conduction phases in accordance with the waveforms shown in FIGS. 18 and 19 is selected for driving the synchronous motor. Then, the processing ends.

In the case where the conduction timing with respect to the counter electromotive voltage pulse is to be advanced or delayed for improving the efficiency, the counter electromotive voltage pulse which is already adjusted is used for performing the foregoing processing.

The drive voltage (PWM duty) reference value during transition can be set in view of the value during the 180°-conduction drive.

In the low speed operation, the counter electromotive voltage which is prounital to the rotation speed is low, and therefore accurate transition may be impossible. In the case where the rotation speed before transition to the intermittent-conduction drive is lower than the predetermined rotation speed, however, the drive voltage (PWM duty) reference value may be set to a high value for performing fast rotation in the drive immediately after the transition, whereby the foregoing problem can be avoided. In the extremely slow range, transition to the intermittent-conduction drive is extremely difficult so that it may be necessary to inhibit the transition, depending on the synchronous motor.

According to an experiment, the rotation speed from 500 to 1000 rpm requires fast rotation immediately after the transition, and the extremely low rotation speed of 500 rpm or less makes the transition impossible. The foregoing predetermined rotation speeds are affected by the amplitude of the counter electromotive voltage or an S/N ratio, and therefore are desirably determined in view of them.

Figure 27:
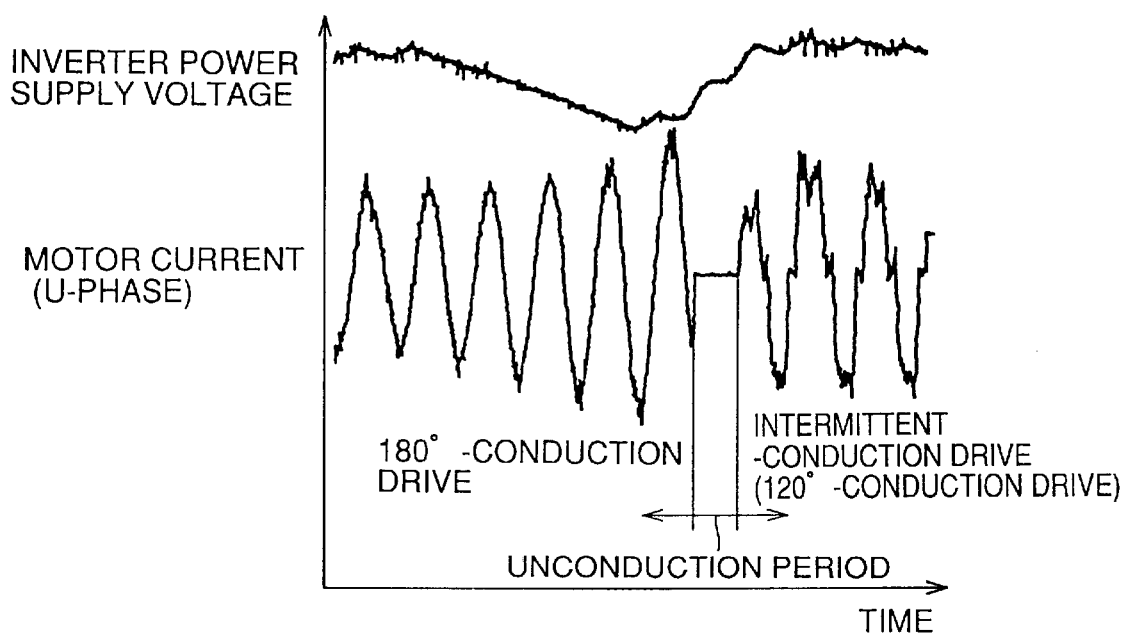
FIG. 27 shows results of an experiment relating to transition from 180°-conduction drive to intermittent-conduction drive.
Figure 28:
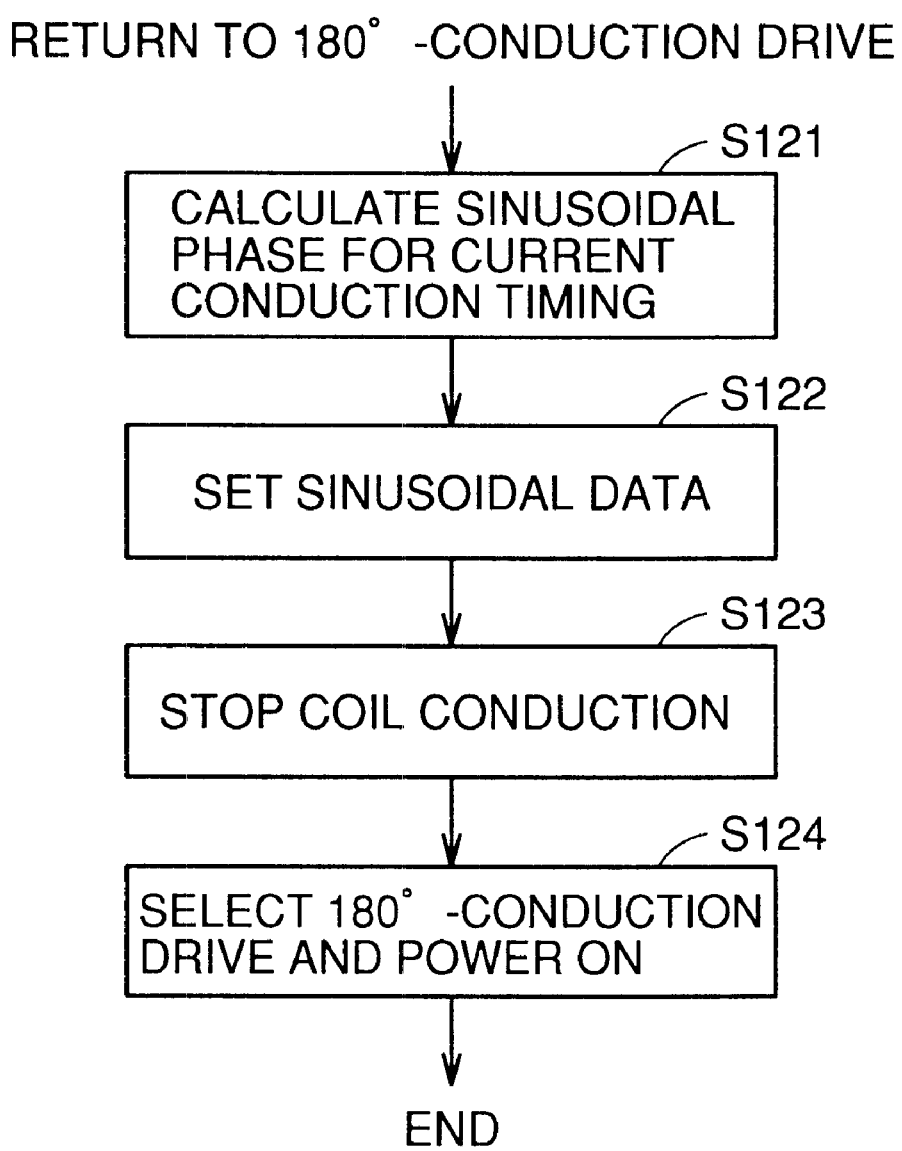
FIG. 28 is a flowchart showing a flow of processing for return from intermittent-conduction drive to 180°-conduction drive.

Results of an experiment relating to transition from the 180°-conduction drive to the intermittent-conduction drive will now be described with reference to FIG. 27 showing a motor current waveform. In this experiment, the rotation speed is 3000 rpm, and the load torque is 1.5 Nm. FIG. 27 shows various waveforms in the case where transition to the intermittent-conduction drive is performed in accordance with occurrence of disturbances which are variations in power supply voltage of inverter circuit 2. The 120°-conduction drive is performed as the intermittent-conduction drive.

As shown in FIG. 27, all the coil terminals are turned off during the transition, and transition to the intermittent-conduction drive is performed reliably. By providing the period for which all the coil terminals are turned off, the counter electromotive voltage can be accurately detected, and the processing of transition to the intermittent-conduction drive can be reliably performed so that switching of the drive method can be performed with improved reliability.

Description will now be made on the processing in step S83 for return from the intermittent-conduction drive shown in FIGS. 23 and 24 to the 180°-conduction drive. In a step S121, the conduction phase in the current state is calculated from the conduction timing. In the 120°-conduction drive conduction drive, it is possible to obtain the above phase by calculating the angle, in terms of sinusoidal wave phase, in the sinusoidal wave corresponding to the point of time when power supply from the U-phase coil to the V-phase coil starts.

In a step S122, the sinusoidal data is set based on the calculated phase. In a step S123, all the coil terminals are temporarily turned off. The purpose of this is to remove completely the influence of the intermittent-conduction drive before switching the conduction drive method at the time of return.

In a step S124, the 180°-conduction drive is selected, and then the return processing ends. The drive voltage (PWM duty) reference value at the time of return can be set in view of the value during the intermittent-conduction drive.

Figure 29:
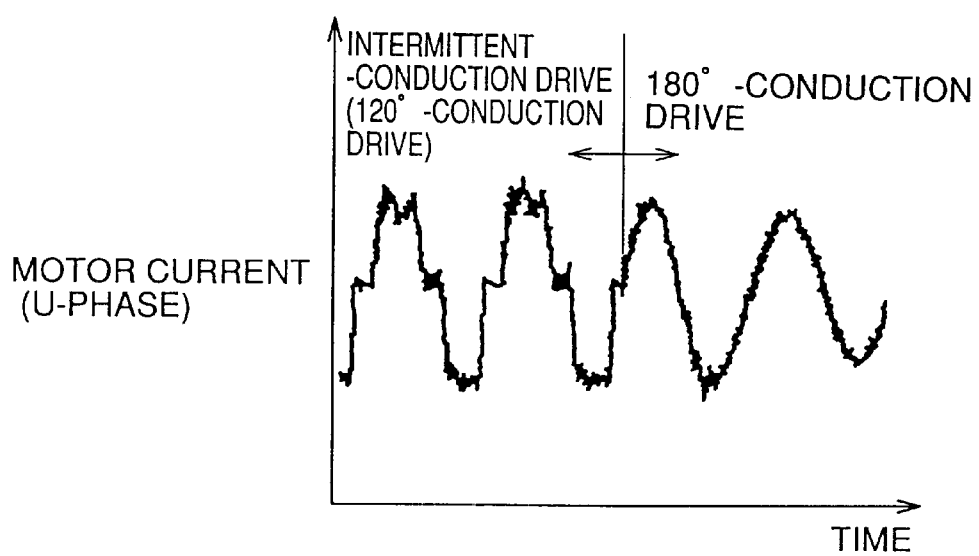
FIG. 29 shows a result of an experiment relating to transition from intermittent-conduction drive to 180°-conduction drive.

A result of an experiment relating to transition from the intermittent-conduction drive to the 180°-conduction drive will now be described with reference to FIG. 29. In this experiment, the rotation speed is 3000 rpm, and the load torque is 1.5 Nm. The 120°-conduction drive is used for the intermittent-conduction drive. FIG. 29 shows a motor current waveform at the time of return to the 180°-conduction drive in response to the fact that the disturbance is reduced or a predetermined has elapsed.

As shown in FIG. 29, the phase information is continuously kept at the time of return, and the return to the 180°-conduction drive with the accurate phase is reliably achieved.

As described above, the phase information of the intermittent-conduction drive is calculated, and this is used as reference when determining the conduction phase in the 180°-conduction drive so that the reliability of the motor drive operation can be improved.

Figure 30:
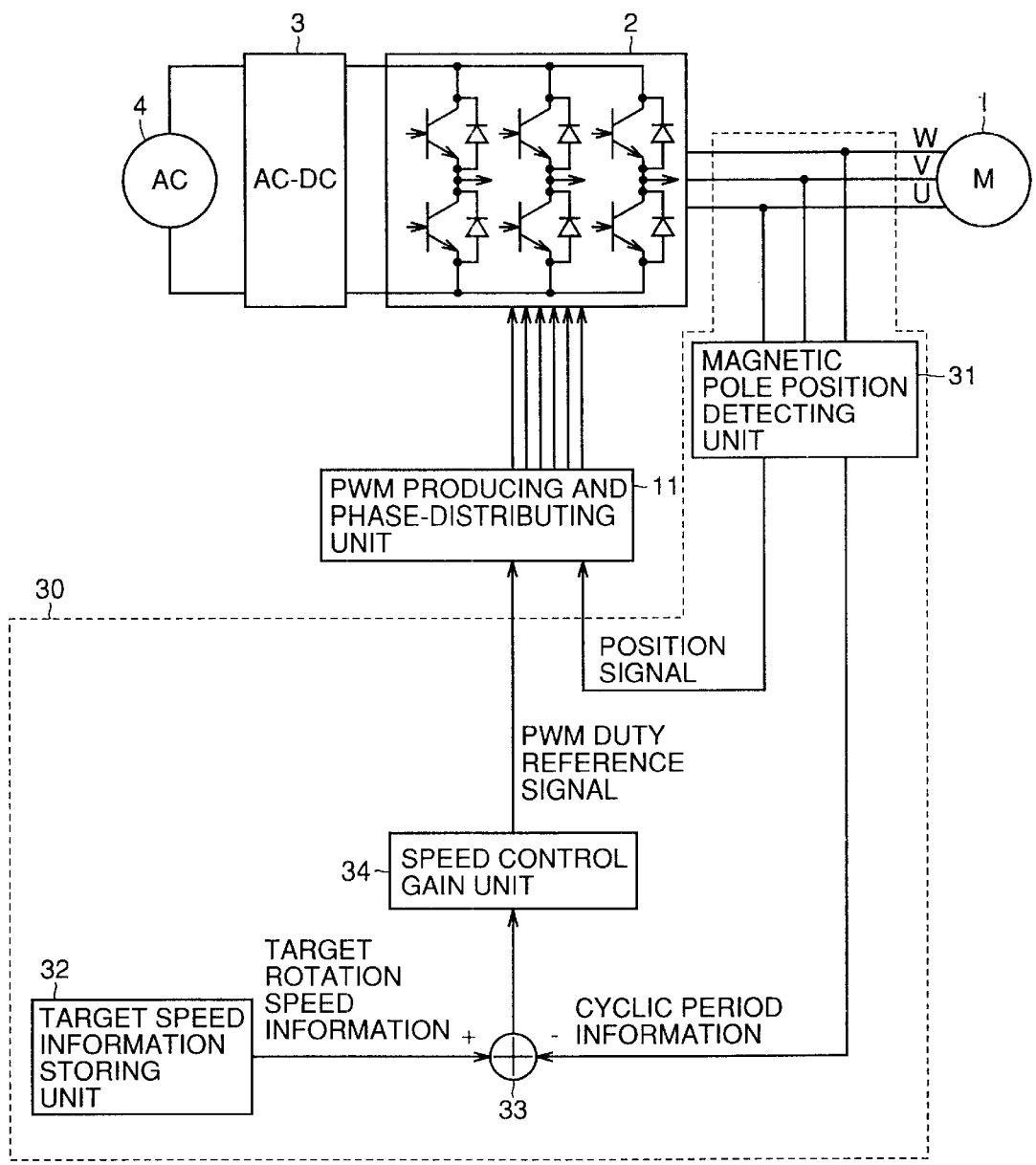
FIG. 30 shows by way of example a specific structure of an intermittent conduction driving unit 30.

Then, a typical structure for the motor drive by intermittent-conduction drive unit 30 will be described below with reference to FIG. 30. In FIG. 30, intermittent-conduction drive unit 30 includes a magnetic pole position detecting unit 31 which makes a reference voltage comparison to detect a rotational position of synchronous motor 1, a target speed information storing unit 32 for storing the target rotation speed information of synchronous motor 1, an adder 33 which calculates an error of cyclic period information of magnetic pole position detecting unit 31 with respect to target cyclic period information of target speed information storing unit 32, and a speed control gain unit 34 which amplifies the error issued from adder 33.

The output of speed control gain unit 34 is sent as the PWM duty reference value to PWM producing and phase-distributing unit 11, and the position signal of magnetic pole position detecting unit 31 is sent as the conduction timing to PWM producing and phase-distributing unit 11. Inverter circuit 2 receives the drive signal from PWM producing and phase-distributing unit 11. Based on this, synchronous motor 1 is driven.

In the case of 120°-conduction drive, an off period is present for each motor coil terminal as shown in FIG. 18, and a counter electromotive voltage occurs in accordance with the movement and rotation of the permanent magnet during this off period. The waveform of the counter electromotive voltage appearing in the off period shifts in accordance with the conduction timing. Accordingly, it is possible to detect the magnetic pole position of the motor rotor, which is the motor rotational position, via the motor coil terminals.

As simple and reliable manners, filtering in magnetic pole position detecting unit 31 can be performed by a low-pass filter with a first-order lag, and the voltage comparison can be performed by a comparison with the intermediate potentials on the motor coil terminals. When the conduction is to be performed with an advanced phase or a delayed phase, the magnetic pole position detection signal pulse is counted, e.g., by a timer, and thereby desired conduction timing is obtained and issued as the position signal. Magnetic pole position detecting unit 31 is required to perform complicated processing such as filtering as well as the voltage conversion. Therefore, magnetic pole position detecting unit 31 may be formed of an external circuit instead of, e.g., a unit within control unit 5 formed of, e.g., a microcomputer.

The magnetic pole position detecting unit 31 is not restricted to the foregoing structure, and may have a structure which compares the motor coil terminal signal with the reference voltage as it is without performing the filtering, and removes the PWM components and noise components for detecting the motor rotational position.

By using intermittent-conduction drive unit 30 described above, the motor rotational position can be reliably detected from the counter electromotive voltages generated on the motor coil terminals. Therefore, the motor drive with high reliability can be achieved.

Then, the structure for motor driving by 180°-conduction drive unit 7 will be described with reference to FIG. 31. As already described, the 180°-conduction drive is performed, e.g., based on arithmetic of the motor current, or by utilizing the neutral point. Among these manners, a so-called phase difference control based on the phase difference between the drive voltage and the motor current shown in FIG. 31 can simplify the required structure and processing, and therefore can achieve the low cost.

In the phase difference control, a zero-cross of the motor current is generally detected for simplifying the processing. However, the following manner shown in FIG. 31 can achieve the driving with higher reliability than the zero-cross detection.

Figure 31:
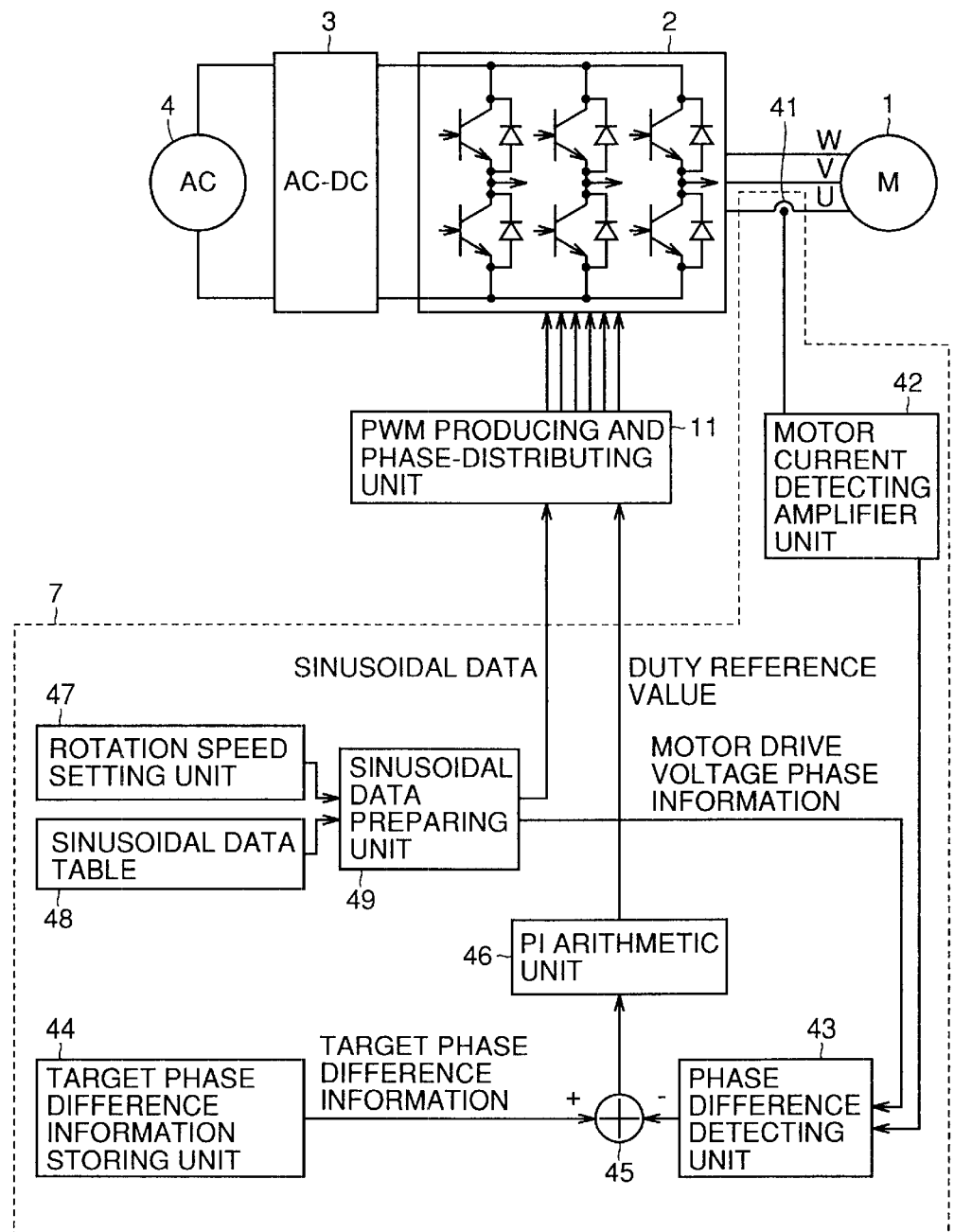
FIG. 31 shows by way of example a specific structure of the 180°-conduction drive unit 7.

In FIG. 31, 180°-conduction drive unit 7 includes a current sensor 41 which detects the motor current flowing through a specific phase (U-phase in the figure) among the U-, V- and W-phases of the motor coil terminals, and a motor current detection amplifier unit 42 which issues a motor current signal after amplifying the detected motor current by a predetermined extent and calculating an offset. Current sensor 41 and motor current detecting amplifier unit 42 are formed of external circuits for achieving more simple and practical structures than the case where they are formed within control unit 5. Further, 180°-conduction drive unit 7 includes a phase difference detecting unit 43, which takes in the motor current signal by performing analog-to-digital conversion in accordance with predetermined timing, and issues the phase difference information obtained by calculation, and a target phase difference information storing unit 44 which has already stored the intended phase difference information (i.e., the target phase difference information).

Phase difference detecting unit 43 samples the motor currents several times every two motor drive phase periods, and integrates the sampled currents for obtaining the motor current signal area for every phase period. As the phase difference information, the area ratios between these motor current signal areas are calculated and issued.

In accordance with the rotation conditions and the distortion of the motor current, the conduction timing which can achieve the maximum efficiency changes. Therefore, it is preferable that the target phase difference information can be set in accordance with the rotation conditions and others at any time.

Further, 180°-conduction drive unit 7 includes an adder 45 for calculating the error data relating to the error between the target phase difference information sent from target phase difference information storing unit 44 and the phase difference information issued from phase difference detecting unit 43, and a PI arithmetic unit 46 which calculates the prounital error data and the integrated error data with respect to the error data calculated by adder 45, and issues the duty reference value. By using the PI control, the residual error of the phase difference can be controlled to be zero.

Further, 180°-conduction drive unit 7 includes a rotation speed setting unit 47 for setting the rotation speed instruction for the synchronous motor, a sinusoidal data table 48 formed of a predetermined number of data items, and a sinusoidal data preparing unit 49. Sinusoidal data preparing unit 49 operates in accordance with the rotation speed instruction and elapsed time to read out the sinusoidal data corresponding to each of the U-, V and W-phases of the motor coils from sinusoidal data table 48, and issues the motor drive voltage phase information of U-phase from the sinusoidal data of U-phase.

Current sensor 41 may be formed of a coil element and a Hall element, or may be a current transformer or the like. In this embodiment of the invention, the motor current of only one specific phase (U-phase) is detected among those of the plurality of phases. However, the motor currents of the respective phases may be detected. This can achieve more precise motor drive.

The sinusoidal data may be prepared by arithmetic instead of the manner based on sinusoidal data table 48 already storing the data.

FIG. 31 shows the structure for the sinusoidal conduction drive as an example of the 180°-conduction drive. Since the sinusoidal conduction drive can achieve smooth supply of the motor current owing to use of the sinusoidal waveform, and therefore can reduce the vibrations and noises. However, the drive waveform is not restricted to the sinusoidal waveform. Drive with higher efficiency can be performed by using the drive waveform conduction which can provide the motor current corresponding to the magnetic flux distribution of the motor rotor.

As described above, phase difference detecting unit 43 calculates the area ratio between the two motor current signal areas detected during the two motor drive potential phase periods, and issues the result as the phase difference information. The PI arithmetic is effected on the error amount between the target phase difference information and the phase difference information issued from the phase difference detecting unit 43. In PWM producing and phase-distributing unit 11 calculates the output duty from the duty reference value, which is the output of PI arithmetic unit 46, and the sinusoidal wave data obtained from the rotation speed instruction every time these are obtained. Based on the values thus calculated, the motor coils are controlled via inverter circuit 2 for driving synchronous motor 1.

In the structure shown in FIG. 31, the magnitude of the drive voltage (duty width of PWM duty) is determined by the phase difference control feedback, which is performed to achieve a constant motor current phase difference with respect to the motor drive voltage (output duty), and the rotation speed is determined based on the sinusoidal data issued at a predetermined frequency for operating synchronous motor 1 at a desired rotation speed. Thereby, the motor can be driven and controlled with the desired phase difference and desired rotation speed.

For the start, forced excitation is performed by forcedly conduction the respective phases to provide the rotating magnetic field, and the control in the manners described above is performed during the normal drive. The phase difference may be controlled as described above.

The fact that synchronous motor 1 can be driven and controlled by the phase difference control described above will now be described based on a result of an experiment performed with an IPM (Interior Permanent Magnet) motor.

The IPM motor including a permanent magnet embedded within a rotor utilizes a so-called magnet torque which is generated in accordance with a magnet flux and a coil current as well as a reluctance torque which generates in accordance with change in inductance of the motor coil depending on a rotor configuration. A sum of the magnet torque and the reluctance torque takes on the maximum value when the rotor occupies a specific relative position with respect to the stator, and this relative position changes depending on the rotation conditions. For driving the IPM motor with high efficiency, the relative position between the rotor and the stator must be detected, and the conduction timing must be optimized for conducting the motor coils when the optimum positional relationship is achieved. Even in the case where the synchronous motor is to be merely driven without giving the consideration to the efficiency, a brake torque may occur to stop the motor unless the conduction timing is within an appropriate range. For example, the intermittent-conduction drive utilizes the counter electromotive voltage for detecting the relative position of the rotor with respect to the stator.

Figure 32:
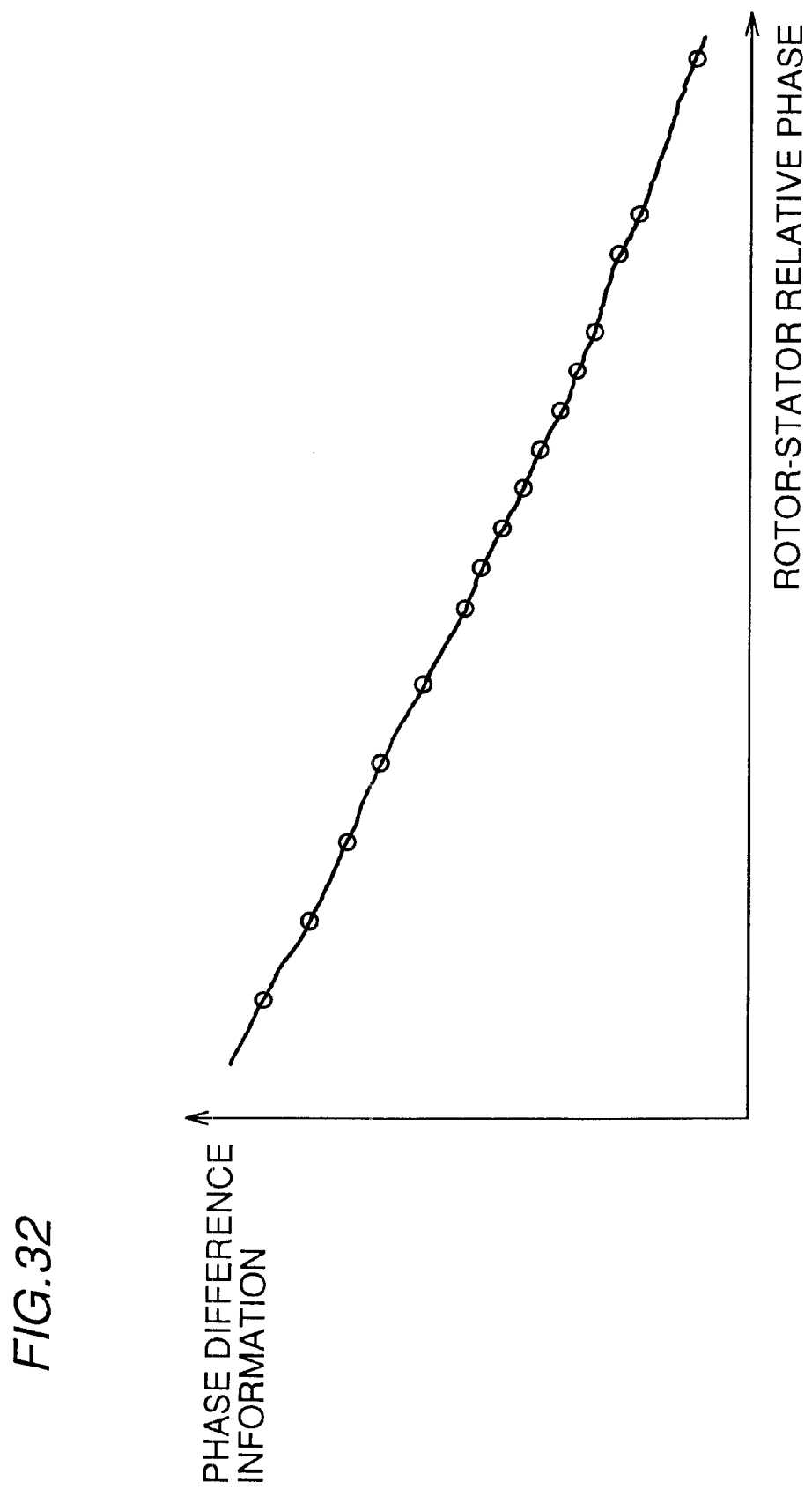
FIG. 32 shows a result of an experiment for driving a synchronous motor based on phase difference control.

Referring to FIG. 32, description will now be made on a result of an experiment, in which the synchronous motor was driven based on the phase difference control according to the sixth embodiment of the invention. In FIG. 32, the ordinate gives the phase difference information, and the abscissa gives rotor-stator relative phase which corresponds to the relative position of the rotor with respect to the stator measured by an encoder representing the motor rotational position. This experiment was performed with the rotation conditions of the rotation speed of 1000 rpm and the load torque of 15 kgf·cm.

The phase difference control according to this embodiment of the invention is not configured to detect directly the position of the rotor relative to the stator. As shown in FIG. 32, however, the positional relationship between the rotor and the stator is substantially prounital to the phase difference information. Accordingly, by controlling the phase difference information to take on a predetermined value, the positional relationship between the rotor and the stator can be indirectly controlled, and therefore the motor can be driven in accordance with the conduction timing achieving the optimum efficiency by optimizing the target phase difference information.

Figure 33:
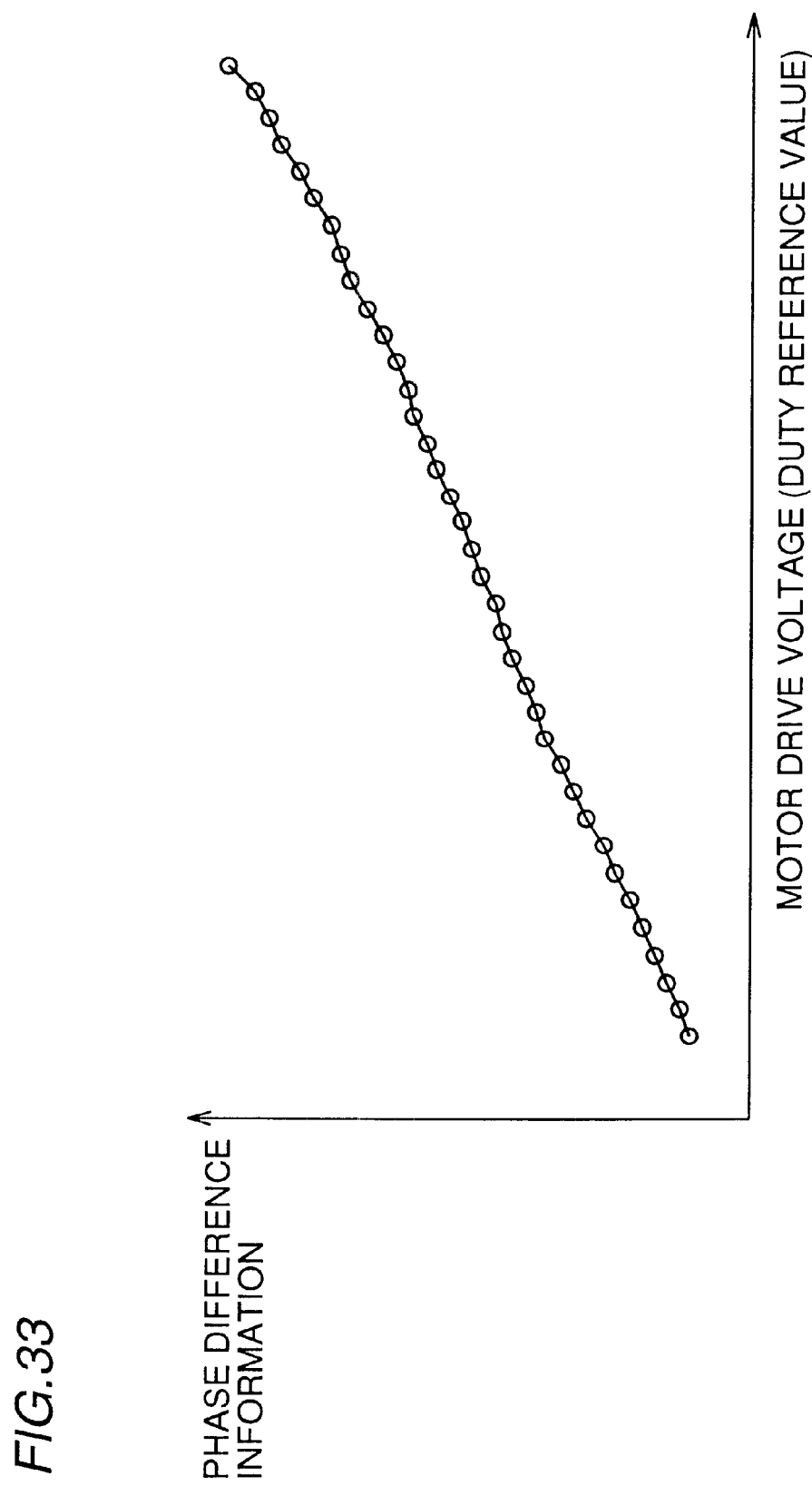
FIG. 33 shows a result of an experiment for determining a relationship between a drive voltage (PWM duty reference value) and phase difference information.

Under the experimental conditions similar to those in FIG. 32, the relationship between the drive voltage (PWM duty reference value) and the phase difference information was measured in an experiment, of which result will now be described with reference to FIG. 33. In FIG. 33, the ordinate gives the phase difference information, and the abscissa gives the motor drive voltage (duty reference value). As shown in FIG. 33, the phase difference information is substantially prounital to the motor drive voltage. Therefore, the phase difference information can be controlled by increasing or decreasing the drive voltage (PWM duty reference value).

More specifically, current/voltage phase difference (phase difference information) is changed by changing the drive voltage (duty reference value) during operation at a constant rotation speed, and the structure of the sixth embodiment of the invention can effectively perform the control by the phase difference control feedback loop increasing/decreasing the drive voltage (duty reference value) based on the phase difference information.

From the above result of experiment, it can be understood that the phase difference control can be performed in spite of the fact that the actual motor current is not formed of a pure sinusoidal wave, but contains distortion components superposed thereon. It can also be understood that the phase difference information based on the motor current signal area ratio of the two phase periods can be detected with sufficiently high accuracy. Naturally, the foregoing problems are overcome, and the detection accuracy is improved, compared with a phase difference detecting method in which only one point such as a zero-cross in the motor current is detected.

Although the respective characteristics in the experimental results described above exhibit nearly prounital relationships, the data are not present on the completely straight line in the strict sense. This is probably due to the distortions in motor current in addition to measuring errors. Therefore, the control system gain of the phase difference control system changes depending on the value of the phase difference. However, the gain as the control system gain can be set taking the above nonlinearity into consideration, and the control system having a further improved accuracy can be achieved by changing the gain of the control system in accordance with the value of the phase difference.

Depending on the rotation conditions, inclinations of the respective characteristics may change. However, the control system can be configured with consideration given to the amount of change of the control system gain depending on the rotation speed, and the control system of a further improved accuracy can be achieved by changing the gain of the control system in accordance with the rotation conditions.

In the above experiment, an inverting amplifier is used as the motor current detection amplifier unit 42.

Then, description will be made on the method of setting the rotation speed in the phase difference control by using the sinusoidal data table, and will be made on the PWM output.

The phase difference control method according to the sixth embodiment of the invention differs, e.g., from a speed control method, in which a counter electromotive voltage pulse is detected, in that the motor rotation speed depends on the frequency of the sinusoidal voltage (PWW supplied to the motor coil, and thus so-called forced excitation drive is employed.

It is assumed that sinusoidal data table 48 has stored data rows, from which a sinusoidal waveform is issued if digital-to-analog output is continuously performed. For example, it is assumed that the data for one cycle period is formed of 360 sinusoidal data items. In this case, each sinusoidal data item forms a value corresponding to an electrical angle of one degree. In the following description, it is assumed that the sinusoidal data table has stored the 360 sinusoidal data items for one cycle period, the PWM carrier frequency is 3 kHz, and synchronous motor 1 makes one rotation for a period equal to two sinusoidal cycle periods per one phase.

In the case of the sinusoidal 180°-conduction, the motor drive voltage (output duty) must have a sinusoidal waveform, and therefore the sinusoidal data must be renewed for every PWM carrier cycle. Further, renewal must be performed 720 (=360×2) times for one rotation of synchronous motor 1.

Assuming that each reference data item in the sinusoidal data table is renewed at every PWM carrier cycle, one rotation requires 0.24 (=720×0.333) milliseconds because the PWM carrier cycle period is equal to 1/3000 =0.333 milliseconds. Therefore, the rotation speed is equal to about 250 rpm. If the structural factors of the motor are not taken into consideration, the motor rotation speed is determined according to the PWM carrier frequency and the renewal period of the reference data in the sinusoidal data table. If the motor has, e.g., three coil phases, the sinusoidal data items which are shifted by the electrical angle of 120 degrees from each other can be referred to as data for the respective phases. Sinusoidal arithmetic may be performed for producing the sinusoidal data every time it is required.

The sinusoidal data thus obtained for each phase is multiplied by the duty reference value which is calculated by the phase difference control. The PWM producing unit such as a PWM waveform generator receives the result of the above multiplication, and issues the PWM waveform. The PWM waveform generator produces, e.g., a triangular wave with a PWM carrier cycle period. A height value of this triangular wave is compared with the result of the above multiplication, and High/Low output is performed based on the result of this comparison.

This PWM waveform generator is formed of a dedicated IC or is achieved by a function of the control microcomputer in many cases. Thereby, the PWM waveform corresponding to each drive element can be easily obtained.

Then, the process from detection of the phase difference information to calculation of the duty reference value as well as the structure for it will now be described.

Figure 34:
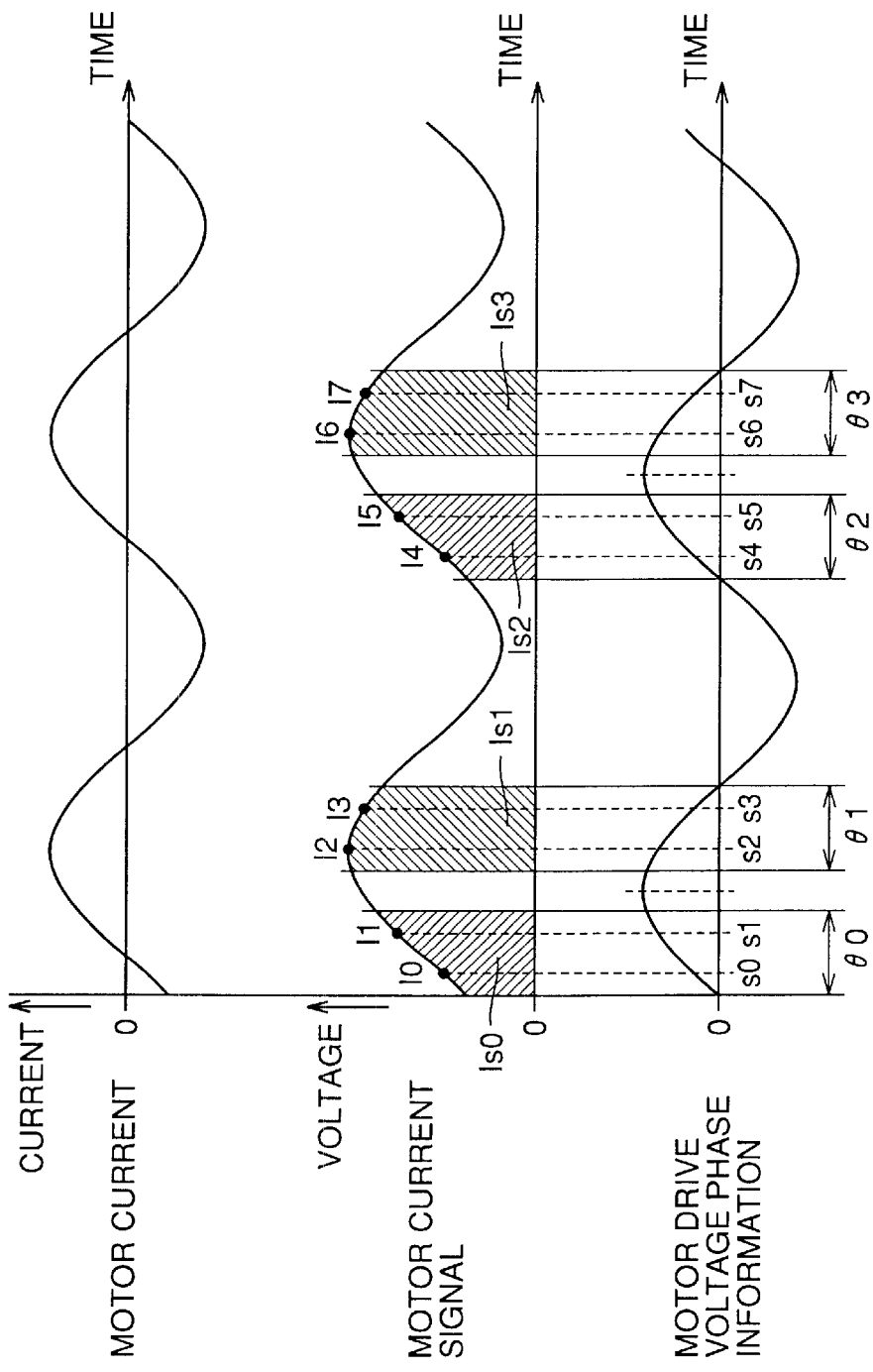
FIG. 34 shows phase difference information detection.
Figure 35:
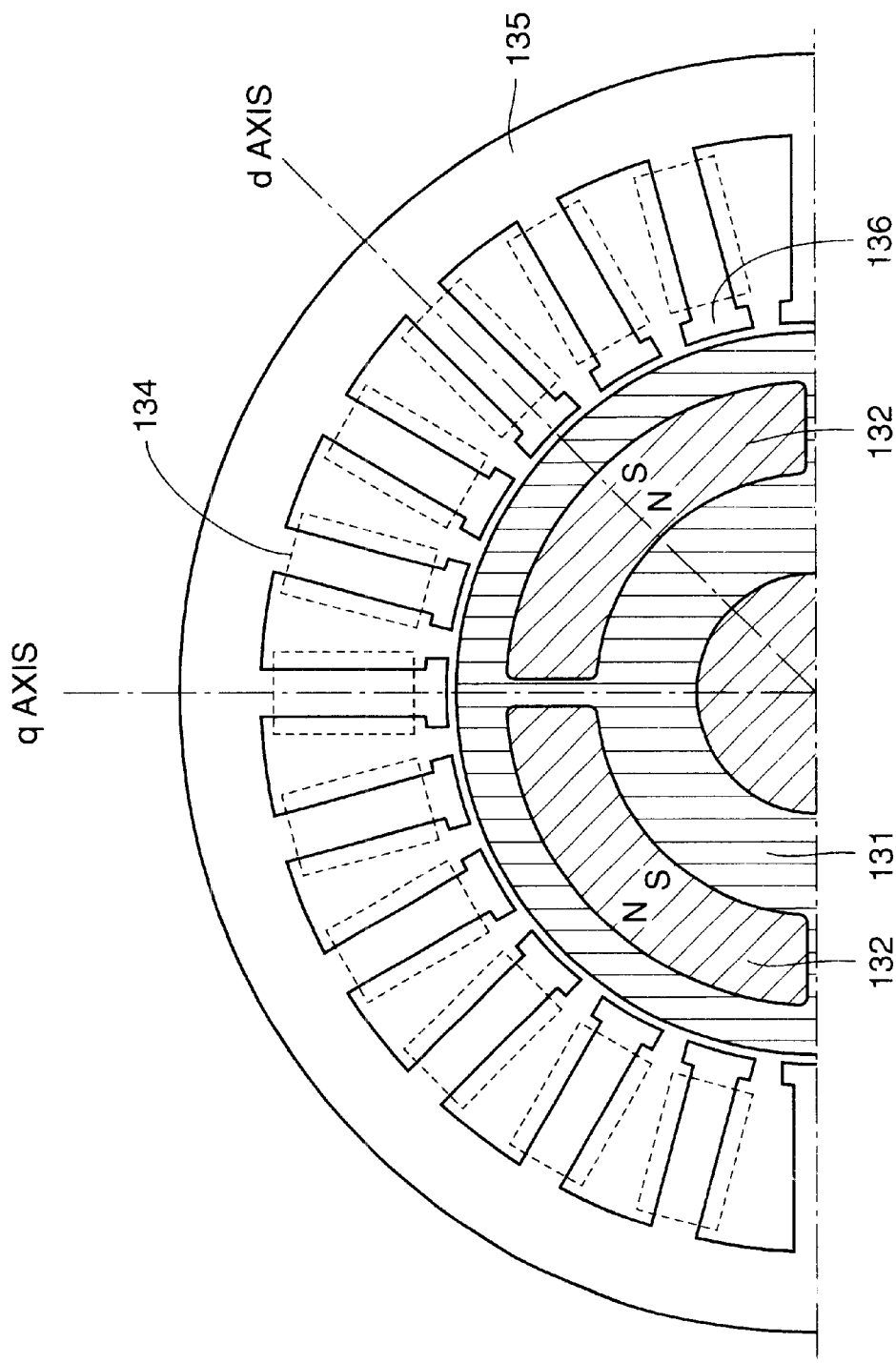
FIG. 35 shows by way of example a prior art structure of an IPM motor.
Figure 36:
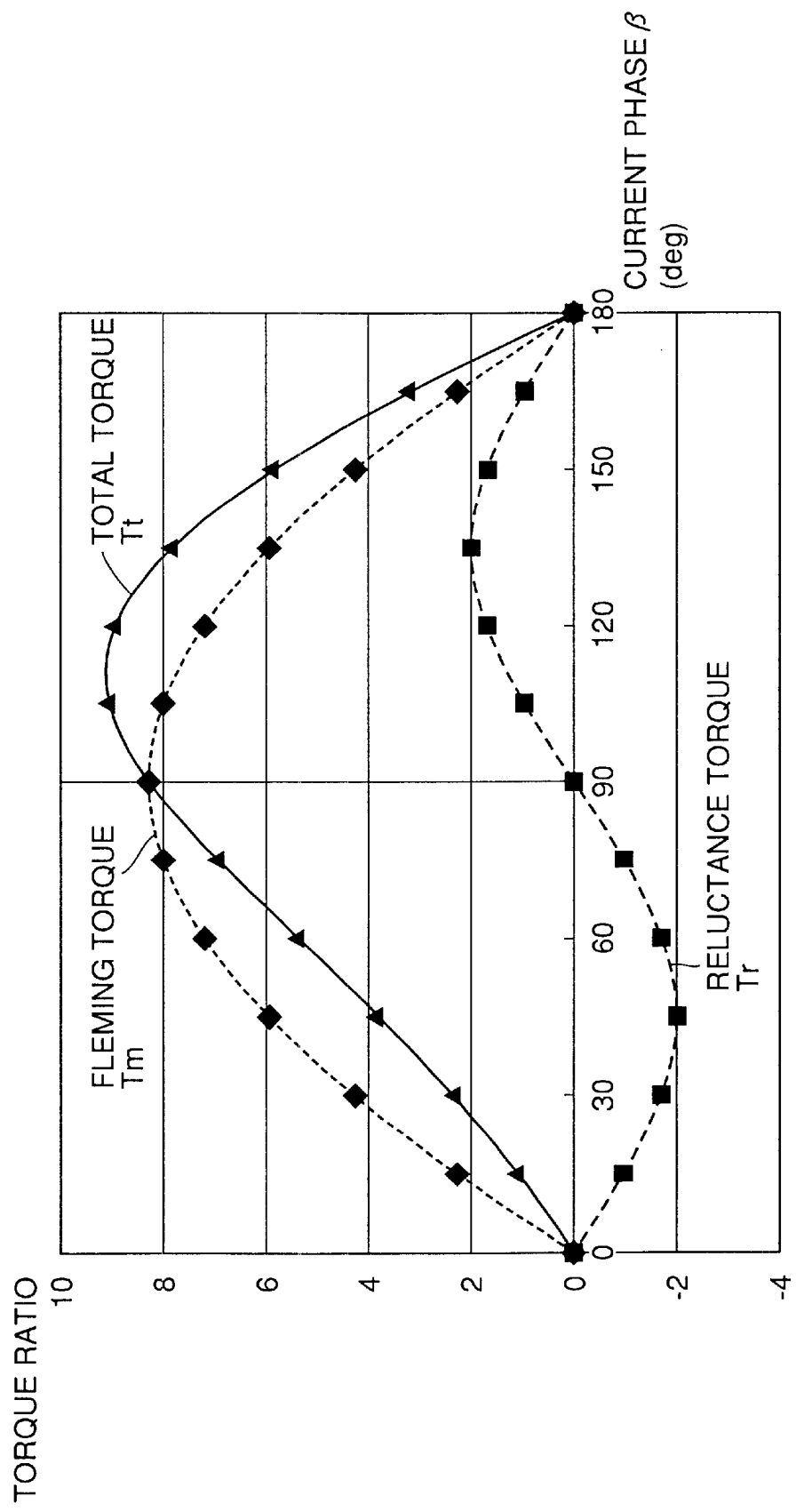
FIG. 36 shows variations in torque of the prior art IPM motor.
Figure 37:
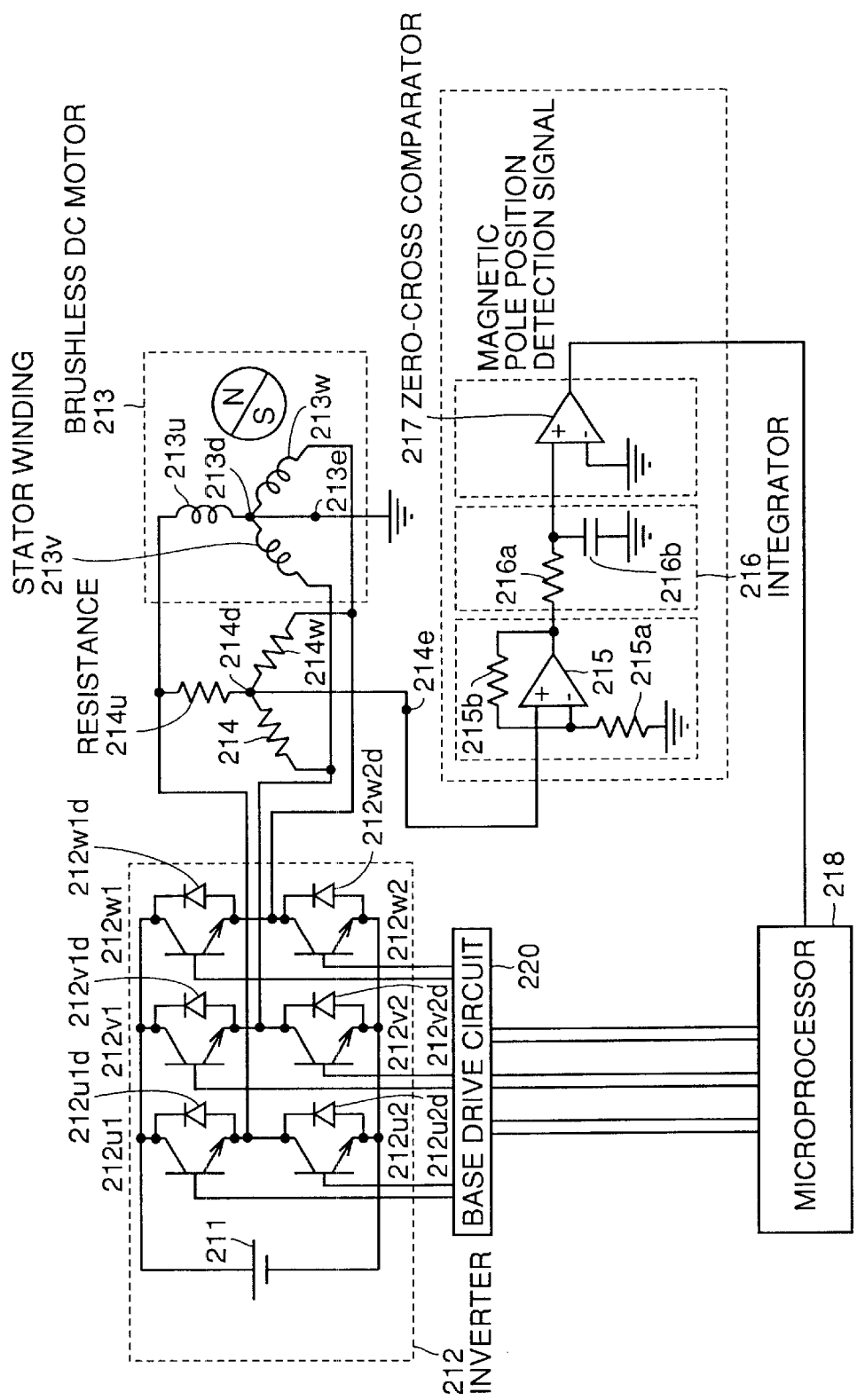
FIG. 37 schematically shows a structure of a prior art motor control device disclosed in a reference 2.

FIG. 34 shows detection of the phase difference information. The motor current of the U-phase has a sinusoidal waveform having a center at the zero level. This motor current is amplified and is subjected to offset setting by motor current detection amplifier unit 42 to produce the motor current signal. This is done for the purpose of keeping the motor current within a conversion-allowed voltage range (e.g., from 0V to+5V) of an A/D converter (not shown).

The motor drive voltage phase information of the U-phase is produced from the sinusoidal data of the U-phase by sinusoidal data producing unit 49. In the practical process, it is not necessary that the motor drive voltage phase information has the sinusoidal waveform, but it is merely required that only the phase information can be obtained.

Phase difference detecting unit 43 is supplied with the motor current signal and motor drive voltage phase information as shown in FIG. 34. Phase difference detecting unit 43 samples the motor current signal from the motor drive voltage phase information for a predetermined phase period which is already set, and more specifically performs the sampling n times (two times in the case of FIG. 18) per one phase period with a predetermined sampling phase (sampling timing).

For example, in a phase period θ0, motor current signals (I0 and I1) are sampled in accordance with sampling timing s0 and s1, respectively. In a phase period θ1, motor current signals (I2 and I3) are sampled in accordance with sampling timing s2 and s3, respectively. In a phase period θ2, motor current signals (I4 and I5) are sampled in accordance with sampling timing s4 and s5, respectively. In a phase period θ3, motor current signals (I6 and I7) are sampled in accordance with sampling timing s6 and s7, respectively.

Assuming that predetermined phase periods θ0 and θ1 are already set, the sampled current sampling data is integrated for each of phase periods θ0 and θ1, and thereby motor current signal areas Is0 and Is1 are calculated (Is0=I0+I1, Is1=I2+I3).

A ratio between the motor current signal areas Is0 and Is1 is calculated, and is used as phase difference information. By setting constant sampling timing s0–s3, the processing can be simplified.

If predetermined phase periods θ2 and θ3 are already set, the sampled current sampling data is integrated for each of phase periods θ2 and θ3, and thereby motor current signal areas Is2 and Is3 are calculated (Is2=I4+I5, Is3=I6+I7). Thereby, a ratio between motor current signal areas Is2 and Is3 is calculated.

The phase period may have the center at the drive voltage electrical angle of 90 degrees or 270 degrees (i.e., inverted value of 90 degrees) as shown in FIG. 34. This is advantageous, e.g., for setting of the target value. Averaging of the phase difference information may be performed several times, whereby the reliability can be improved.

As described above, the drive method for the 180°-conduction drive is configured to detect the phase difference between the motor drive voltage and the motor current, whereby the processing and circuits can be simplified. Further, the motor current areas are obtained, and thereby the phase difference information is obtained from the ratio between them, whereby the phase difference can be detected with high reliability. Further, the detection of this area ratio is performed using the motor current sampling data obtained by performing the sampling several times. Thereby, the phase difference detection with high reliability can be achieved by simple processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor control device for driving and controlling a synchronous motor formed of a rotor provided with a permanent magnet and drive means for driving said synchronous motor without using a position sensor, comprising:
   180°-conduction drive means for performing 180°-conduction drive of said synchronous motor;
   intermittent-conduction drive means for performing intermittent-conduction drive of said synchronous motor with a conduction angle smaller than 180 degrees and an unconduction period;
   motor disturbance monitoring means for monitoring a disturbance against at least one of said synchronous motor and said drive means by detecting variation of a physical value affecting tho driving and controlling of said synchronous motor; and
   drive method selecting means for selecting one of said 180°-conduction drive and said intermittent-conduction drive as a drive method of said synchronous motor in accordance with an output of said motor disturbance monitoring means.

2. The motor control device according to claim 1, wherein a conduction angle of said intermittent-conduction drive means is equal to 120 degrees.

3. The motor control device according to claim 1, wherein said drive means includes:
   an inverter unit for driving said synchronous motor, and
   an AC power supply unit provided for said inverter unit for supplying an AC power supply voltage; and
   said motor disturbance monitoring means monitors at least one of a DC power supply voltage in said inverter unit and said AC power supply voltage supplied from said AC power supply means.

4. The motor control device according to claim 1, wherein said motor disturbance monitoring means monitors a rotation speed of said synchronous motor.

5. The motor control device according to claim 1, wherein said motor disturbance monitoring means monitors torque of said synchronous motor.

6. The motor control device according to claim 1, wherein said motor disturbance monitoring means monitors motor current of said synchronous motor.

7. The motor control device according to claim 1, wherein said motor disturbance monitoring means monitors a phase difference between drive voltage of a specific phase of said synchronous motor and motor current of said synchronous motor.

8. The motor control device according to claim 1, wherein said motor disturbance monitoring means monitors at least one of a disturbance affecting a drive of said synchronous motor and a disturbance signal changing in synchronization with said disturbance.

9. The motor control device according to claim 1, wherein said motor disturbance monitoring means determines whether a state of said synchronous motor and said drive means is a normal state or an unusual state, based on the monitored disturbance, and
   said drive method selecting means performs switching said drive method to select said 180°-conduction drive when said motor disturbance monitoring means detects said normal state, and select said intermittent-conduction drive when said unusual state is detected.

10. The motor control device according to claim 1, wherein
   said motor disturbance monitoring means determines whether a state of said synchronous motor and said drive means is a normal state or an unusual state, based on the monitored disturbance, and
   said drive method selecting means selects said 180°-conduction drive when said motor disturbance monitoring means detects said normal state, selects said intermittent-conduction drive when said unusual state is detected, and selects said 180°-conduction drive upon elapsing of a predetermined time from the selection of said intermittent-conduction drive.

11. The motor control device according to claim 9, wherein
   said motor disturbance monitoring means detects said unusual state when a variation in the power supply voltage is larger than an allowed variation.

12. The motor control device according to claim 9, wherein
   said motor disturbance monitoring means detects said unusual state when at least one of a variation in rotation speed of said synchronous motor and a variation in said rotation speed is larger than an allowed variation.

13. The motor control device according to claim 9, wherein
said motor disturbance monitoring means detects said unusual state when a variation in torque of said synchronous motor is larger than an allowed variation.

14. The motor control device according to claim 9, wherein
said motor disturbance monitoring means detects said unusual state when a variation in motor current of said synchronous motor is larger than an allowed variation.

15. The motor control device according to claim 9, wherein
said motor disturbance monitoring means detects said unusual state when a variation in phase difference between the drive voltage in a specific phase of said synchronous motor and the motor current of said synchronous motor is larger than an allowed variation.

16. The motor control device according to claim 9, wherein
said motor disturbance monitoring means detects said unusual state when at least one of a disturbance affecting motor drive of said synchronous motor and a disturbance signal changing in synchronization with said disturbance is larger than an allowed variation.

17. The motor control device according to claim 9, wherein
said motor disturbance monitoring means determines whether the state is said normal state or said unusual state, based on predetermined threshold data, and
said motor disturbance monitoring means changes said threshold data in accordance with rotation conditions of said synchronous motor.

18. The motor control device according to claim 1, wherein
said drive method selecting means provides a period for stopping conduction of said synchronous motor when switching said drive method from said 180°-conduction drive to said intermittent-conduction drive.

19. The motor control device according to claim 18, wherein
said intermittent-conduction drive means sets a rotation speed such that the rotation speed to be attained after transition to said intermittent-conduction drive is higher than the rotation speed during said 180°-conduction drive when the rotation speed of said synchronous motor is lower than a predetermined value and said drive method is to be switched from said 180°-conduction drive to said intermittent-conduction drive.

20. The motor control device according to claim 1, wherein
said 180°-conduction drive means determines a conduction phase of said 180°-conduction drive based on the conduction timing immediately before the switching from said intermittent-conduction drive to said 180°-conduction drive.

21. The motor control device according to claim 1, wherein
said intermittent-conduction drive means performs switching of conduction in response to detection of a counter electromotive voltage generated on a motor terminal of said synchronous motor.

22. The motor control device according to claim 1, wherein
said 180°-conduction drive means performs motor driving by controlling current phase difference information relating to a phase difference between drive voltage applied to the motor terminal of a specific phase in said synchronous motor and motor current flowing through said motor terminal.

23. The motor control device according to claim 22, wherein
said 180°-conduction drive means produces said current phase difference information by calculating a ratio between a first motor current area obtained by integrating said motor current within a first phase period and a second motor current area obtained by integrating the motor current during a second phase period,
said first and second phase period is set with reference to the drive voltage phase in said synchronous motor.

24. The motor control device according to claim 23, wherein
said 180°-conduction drive means obtains said first motor current area by sampling a predetermined number of times said motor current during said first phase period and integrating the sampled current sampling data, and obtains said second motor current area by sampling said predetermined number of times said motor current during said second phase period and integrating the sampled current sampling data.

25. The motor control device according to claim 1, wherein the variation of said physical value is continuous.

* * * * *